(12) United States Patent  
Mickens

(10) Patent No.: US 9,292,367 B2  
(45) Date of Patent: Mar. 22, 2016

(54) EFFICIENT MIGRATION OF CLIENT-SIDE WEB STATE

(71) Applicant: Microsoft Corporation, Redmond, WA (US)

(72) Inventor: James W. Mickens, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 52 days.

(21) Appl. No.: 14/247,395

(22) Filed: Apr. 8, 2014

(65) Prior Publication Data

US 2015/0286511 A1    Oct. 8, 2015

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/54 | (2006.01) | |
| G06F 9/48 | (2006.01) | |

(52) U.S. Cl.
CPC .............. *G06F 9/544* (2013.01); *G06F 9/4856* (2013.01)

(58) Field of Classification Search
None
See application file for complete search history.

(56) References Cited

U.S. PATENT DOCUMENTS

| | | | |
|---|---|---|---|
| 7,526,559 B1 | 4/2009 | Phillips | |
| 7,716,280 B2 | 5/2010 | Meijer et al. | |
| 8,171,137 B1 | 5/2012 | Parks et al. | |
| 8,473,577 B2 | 6/2013 | Chan | |
| 8,533,532 B2 | 9/2013 | Wenig et al. | |
| 8,595,356 B2 | 11/2013 | Mishra et al. | |
| 2003/0195963 A1 | 10/2003 | Song et al. | |
| 2004/0131135 A1* | 7/2004 | Kojima et al. | 375/368 |
| 2005/0066037 A1 | 3/2005 | Song et al. | |
| 2005/0204047 A1* | 9/2005 | Mitchell et al. | 709/228 |
| 2009/0063690 A1 | 3/2009 | Verthein et al. | |
| 2010/0329149 A1* | 12/2010 | Singh et al. | 370/254 |
| 2012/0151041 A1* | 6/2012 | Gerber et al. | 709/224 |
| 2013/0041790 A1 | 2/2013 | Murugesan et al. | |
| 2013/0159832 A1* | 6/2013 | Ingargiola et al. | 715/220 |
| 2013/0212212 A1 | 8/2013 | Addepalli et al. | |
| 2013/0238559 A1 | 9/2013 | Bushman | |
| 2014/0032706 A1 | 1/2014 | Kuscher et al. | |

FOREIGN PATENT DOCUMENTS

WO    2012107433    8/2012

OTHER PUBLICATIONS

Reflection: get Object state from return type of method in runtime, Oct. 16, 2011, Stackoverflow.com.*

(Continued)

*Primary Examiner* — Craig Dorais
(74) *Attorney, Agent, or Firm* — Alin Corie; Sandy Swain; Micky Minhas

(57) ABSTRACT

A state migration module (SMM) is described herein which seamlessly, efficiently, and correctly transfers application state between user computing devices, or between different interactions with the application on the same device that occur at different respective times. The SMM operates by capturing the current state of an application relative to the operation of a high-level execution platform (such as a browser) on which the application runs, rather than capturing the overall low-level state of the computing that runs the application. The SMM can include additional provisions designed to improve the efficiency of state migration, such as asynchronous migration, incremental delta-based migration, etc.

20 Claims, 18 Drawing Sheets

(56) References Cited

OTHER PUBLICATIONS

Aller, Max, "HydrateJS," available at <<http://nanodeath.github.io/HydrateJS/>>, accessed on Apr. 13, 2014, nanodeath, 3 pages.

"Split Browser Architecture," available at <<http://docs.aws.amazon.com/silk/latest/developerguide/split-arch.html>>, accessed on Apr. 13, 2014, Amazon Silk Developer Guide, Amazon.com, Seattle, WA, 1 page.

Chacos, Brad, "Firefox and Chrome Give Browser Plug-ins the Cold Shoulder," available at <<http://www.pcworld.com/article/2049366/firefox-and-chrome-give-browser-plug-ins-the-cold-shoulder.html>>, PCWorld, Sep. 25, 2013, 6 pages.

Clark, et al., "Live Migration of Virtual Machines," In Proceedings of the 2nd ACM/USENIX Symposium on Networked Systems Design and Implementation, vol. 2, 2005, 14 pages.

Crockford, D., "The Application/Json Media Type for JavaScript Object Notation (JSON)," available at <<https://tools.ietf.org/html/rfc4627>>, Network Working Group, Request for Comments: 4627, Jul. 2006, 10 pages.

Douglis, et al., "Transparent Process Migration: Design Alternatives and the Sprite Implementation," In Journal of Software-Practice & Experience, vol. 21, Issue 8, 1991, 29 pages.

"REST Developer Center," available at <<http://developer.ebay.com/developercenter/rest/>>, accessed on Apr. 13, 2014, ebay developers program, ebay Inc., San Jose, CA, 2 pages.

Funfroken, Stefan, "Transparent Migration of Java-Based Mobile Agents," In Proceedings of the Second International Workshop on Mobile Agents, 1998, 12 pages.

"SPDY Protocol-Draft 2," available at <<http://www.chromium.org/spdy/spdy-protocol/spdy-protocol-draft2>>, accessed on Apr. 13, 2014, The Chromium Projects, Google, Mountain View, CA, 15 pages.

"Sync Tabs across Devices," available at <<https://support.google.com/chrome/answer/2591582?hl=en>>, accessed on Apr. 13, 2014, Google, Mountain View, CA, 3 pages.

"http archive Trends," available at <<http://httparchive.org/trends.php>>, accessed on Apr. 13, 2014, 6 pages.

Lange, et al., "Aglets: Programming Mobile Agents in Java," In Proceedings of Worldwide Computing and Its Applications, 1997, 14 pages.

Lo, et al., "Imagen: Runtime Migration of Browser Sessions for JavaScript Web Applications," In Proceedings of the 22nd International Conference on World Wide Web, May 13, 2013, 11 pages.

Ma, et al., "M-JavaMPI: A Java-MPI Binding with Process Migration Support," In Proceedings of 2nd IEEE/ACM International Symposium on Cluster Computing and the Grid, 2002, 9 pages.

Malgi, et al., "STRING: Efficient Implementation of Strongly Migrating Mobile Agents in Java," In Proceedings of the ISCA 18th International Conference on Parallel and Distributed Computing Systems, 2005, 8 pages.

Mickens, James, "Rivet: Browser-agnostic Remote Debugging for Web Applications," In Proceedings of the USENIX Conference on Annual Technical Conference, Jun. 2012, 13 pages.

Mickens, James, "Crom: FasterWeb Browsing Using Speculative Execution," In Proceedings of the 7th USENIX Symposium on Networked Systems Design and Implementation, 2010, 16 pages.

Mickens, James, "Mugshot: Deterministic Capture and Replay for JavaScript Applications," In Proceedings of the 7th USENIX Conference on Networked Systems Design and Implementation, 2010, 15 pages.

Milojicic, et al., "Process Migration," In Journal of ACM Computing Surveys, vol. 32, Issue 3, 2000, 59 pages.

Muthitacharoen, et al., "A Low-Bandwidth Network File System," In Proceedings of the Eighteenth ACM Symposium on Operating Systems Principles, 2001, 14 pages.

Osman, et al., "The Design and Implementation of Zap: A System for Migrating Computing Environments," In Proceedings of the 5th Symposium on Operating Systems Design and Implementation, 2002, 16 pages.

Powell, et al., "Process Migration in DEMOS/MP," In Proceedings of the Ninth ACM Symposium on Operating Systems Principles, 1983, 10 pages.

Rashid, et al., "Accent: A Communication Oriented Network Operating System Kernel," In Proceedings of the Eighth ACM Symposium on Operating Systems Principles, 1981, 12 pages.

Rodriguez, Alex, "RESTful Web Services: The basics," available at <<http://www.ibm.com/developerworks/webservices/library/ws-restful/>>, IBM DeveloperWorks, IBM, Armonk, NY, Nov. 6, 2008, 11 pages.

Satyanarayanan, et al., "Pervasive Personal Computing in an Internet Suspend/Resume System," In IEEE Internet Computing, vol. 11, Issue 2, 2007, 16 pages.

Smith, et al., "The Mojave Compiler: Providing Language Primitives for Whole-Process Migration and Speculation for Distributed Applications," In Proceedings of IEEE International Parallel and Distributed Processing Symposium, 2007, 8 pages.

Truyen, et al., "Portable Support for Transparent Thread Migration in Java," In Proceedings of the Joint Symposium on Agent Systems and Applications/Mobile Agents, 2000, 14 pages.

"Twilio REST Web Service Interface," available at <<http://www.twilio.com/docs/api/rest>>, accessed on Apr. 13, 2014, Twilio, San Francisco, CA, 3 pages.

"REST API v1.1 Resources," available at <<https://dev.twitter.com/docs/api/1.1>>, accessed on Apr. 13, 2014, Twitter Inc., San Francisco, CA, 7 pages.

"Web Storage, W3C Working Draft," available at <<http://www.w3.org/TR/2009/WD-webstorage-20091029>>, W3C, (Ed.) Ian Hickson, Oct. 29, 2009, 20 pages.

Wellons, Christopher, "ResurrectJS," available at <<https://github.com/skeeto/resurrect-js>>, accessed on Apr. 13, 2014, 2 pages.

Wellons, Christopher, "Precise JavaScript Serialization with ResurrectJS," available at <<http://nullprogram.com/blog/2013/03/28/>>, null program, Mar. 28, 2013, 6 pages.

Welsh, et al., "Data Compression Proxy," available at <<https://developers.google.com/chrome/mobile/docs/data-compression>>, accessed on Jan. 29, 2014, Google Chrome Mobile, Google Developers, Google, Mountain View, CA, 2 pages.

"Document Object Model (DOM)," available at <<http://www.w3.org/DOM/>>, accessed on Apr. 13, 2014, W3C, 3 pages.

REST API, available at <<http://developeryammercom/restapi/>>, accessed on Apr. 13, 2014, Yammer Developer Center, Yammer, Inc., San Francisco, CA, 23 pages.

Bellucci, et al., "Engineering JavaScript State Persistence of Web Applications Migrating across Multiple Devices," In Proceedings of the 3rd ACM SIGCHI Symposium on Engineering Interactive Computing Systems, 2011, 6 pages.

Kozuch, et al., "Internet Suspend/Resume," available at <<http://www.intel-research.net/Publications/Pittsburgh/110620030912_88.pdf>>, Report No. IRP-TR-02-01, Intel Research Pittsburgh, Intel Corporation, Santa Clara, California, Apr. 2002, 8 pages.

"International Search Report and Written Opinion Issued in PCT Application No. PCT/US2015/023754", Mailed Date: Aug. 12, 2015, 11 pages. (MS# 341203.02).

Ofuonye, et al., "Securing Web-Clients with Instrumented Code and Dynamic Runtime Monitoring", In Journal of Systems and Software, vol. 86, Issue 6, Jun. 2013, pp. 1689-1711.

* cited by examiner

EFFICIENT MIGRATION OF CLIENT-SIDE WEB STATE

BACKGROUND

Users commonly interact with a wide variety of services via browsers. For example, many users predominantly or exclusively use web-enabled Email applications, rather than more traditional desktop Email functionality. In another trend, users now commonly interact with applications via multiple user devices. For example, a user may interact with the same application at different times and in different respective contexts using a smartphone, a tablet-type device, a games console, and/or a traditional desktop computing device, etc. In the near future, users may also add wearable computing devices to their suite of commonly-used computing devices.

Consider a scenario in which a user wishes to suspend his or her interaction with a particular web-enabled application on a first device, and resume that interaction, at a later time, on a second device (or on the same device). No functionality currently exists for efficiently and correctly preserving the state of the user's interaction with the application at the first device, and making that state available to the second (or first) device. One existing mechanism allows a user to preserve his or her tab selections when moving from a first device to a second device; but this mechanism does not preserve the content of the user's session. Further, data center environments commonly use virtual machine technology to transfer state between computing devices, using a hypervisor or the like. But an image produced by this technology may be very large in size. It is not feasible to send such a large quantity of information over common commercial links, such as a wireless cellular connection.

SUMMARY

A state migration module (SMM) is described herein which seamlessly, efficiently, and correctly transfers application state between user computing devices, or between different interactions with the application on the same device that occur at different respective times. The SMM operates by preserving the current state of the application relative to the execution of a high-level program on a browser execution environment or like environment, rather than the operation of the underlying computing device as a whole. This characteristic reduces the amount of information that is needed to describe the current state of the application. For example, the state captured by the SMM does not reflect the low-level state associated with the hardware or operating system interface of the computing device.

According to another illustrative aspect, the SMM may be implemented as a library module which is received from a remote entity, along with an application code module that performs the functions of the application. The execution environment (e.g., the browser) may execute the library module using its native resources, without necessarily asking the user to manually install a special program or the like (although that scenario is also not precluded).

According to another illustrative aspect, the SMM captures features of the current application state by leveraging, in part, the introspective/reflective capabilities of language that is used to express the application.

According to another illustrative aspect, the SMM captures richly descriptive state information. For example, the SMM can capture features that describe information stored in heap memory (including environment-defined objects and functions, and application-defined objects and functions), features that describe the DOM tree associated with the application, features that describe timers registered by the application, features which describe in-progress network connections, features that describe information stored by the application in a local data store, and so on.

According to another illustrative aspect, the SMM can apply special provisions to expose the application state, such as by statically rewriting closures, and using imposition or other techniques to monitor the manner in which the application creates and removes timers, event handlers, etc.

According to another illustrative aspect, the SMM can employ additional provisions to improve the efficiency of state migration. In one case, an application developer may add tags to features of the application; the SMM then processes the features in a particular manner based on those tags. For instance, one type of tag may instruct the SMM to asynchronously restore the state associated with an associated feature.

In another provision designed to improve migration efficiency, the SMM may store state information on an incremental basis, prior to the suspension of the application.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of an environment for migrating application state. The environment leverages instances of a state migration module (SMM) that runs on computing devices. Section B describes the operation of a state capture module, which is a component of each SMM. Section C describes the operation of a state restoration module, which is another component of the SMM. Section D describes various mechanisms that are designed to improve the efficiency in which state is migrated. Section E describes illustrative computing functionality that can be used to implement any aspect of the features described in foregoing sections.

Figure 27:
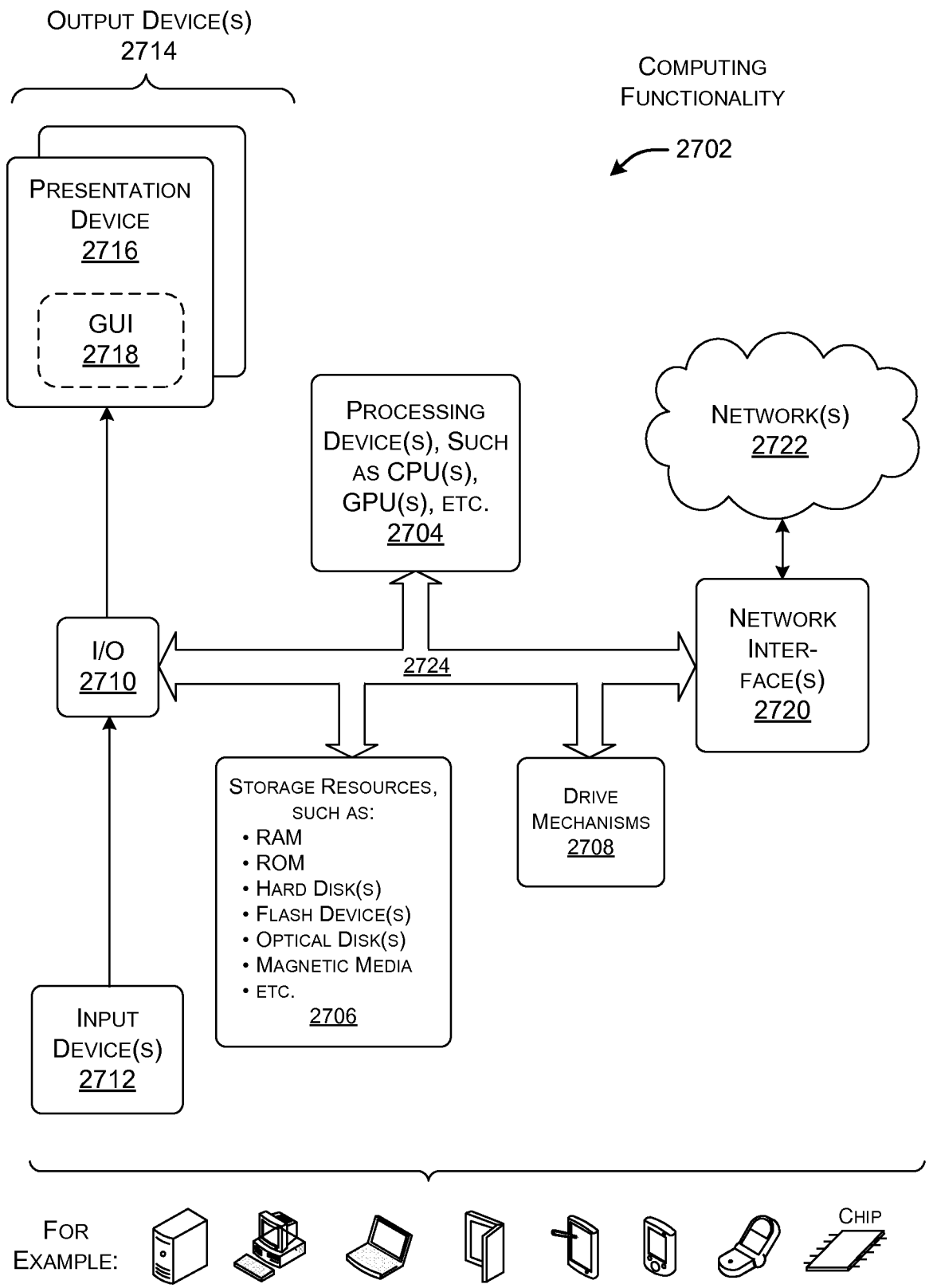
FIG. 27 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 27, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Further, any description of a single entity is not intended to preclude the use of plural such entities; similarity, a description of plural entities is not intended to preclude the use of a single entity. Finally, the terms "exemplary" or "illustrative" refer to one implementation among potentially many implementations.

A. Overview of the Migration Framework

Figure 1:
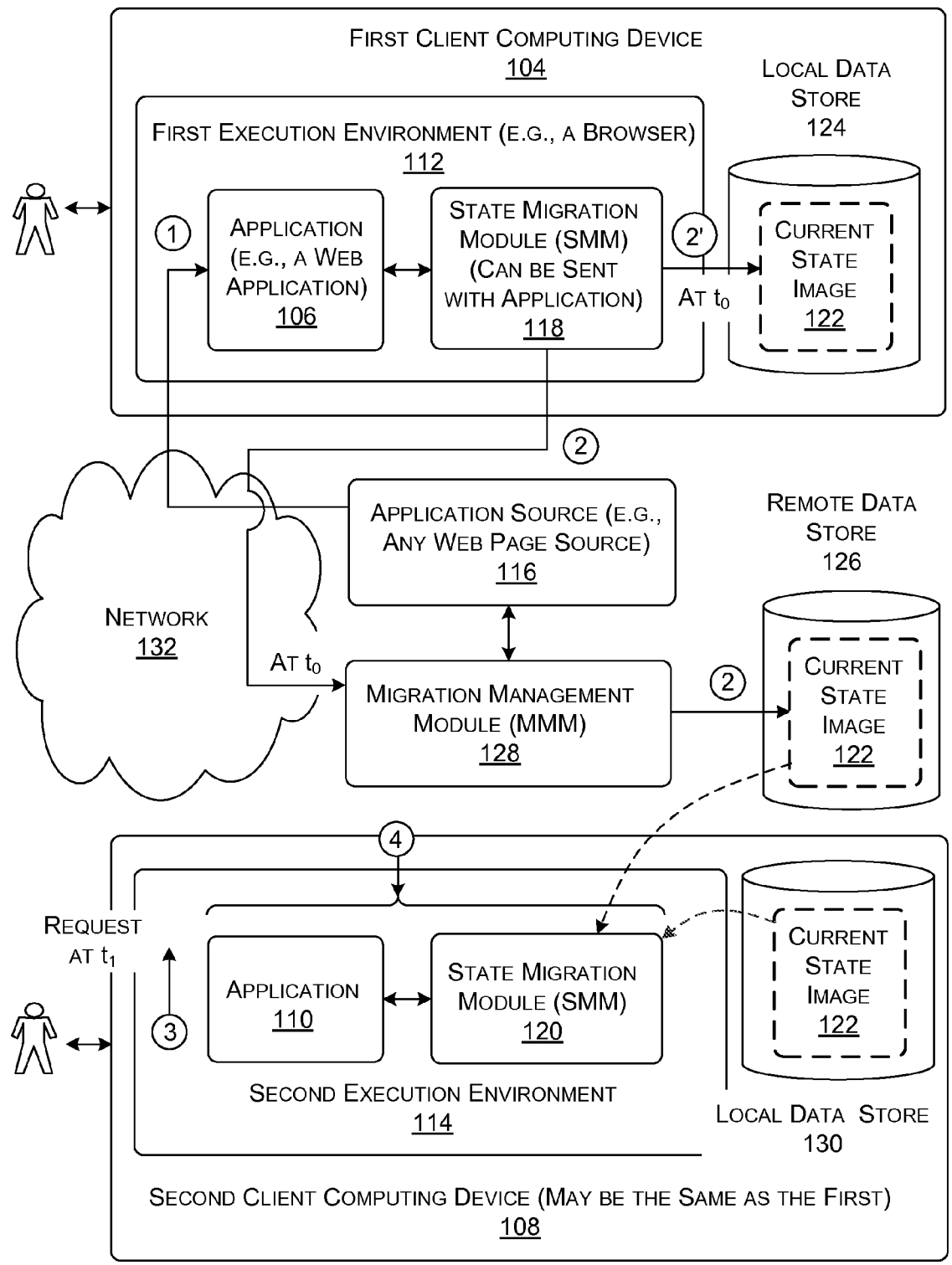
FIG. 1 shows an environment that seamlessly and correctly transfers the state of an application between two computing devices, or between two interactions using the same device at different respective times.

FIG. 1 shows an environment 102 in which a first computing device 104 captures a current state of a first instance 106 of an application. A second computing device 108, at a later time, resumes interaction with another instance 110 of the same application, starting from a juncture defined by the current state, as captured by the first computing device 104. In one scenario, the first computing device 104 differs from the second computing device 108. In another scenario, the first computing device 104 is the same as the second computing device 108. But to simplify the following explanation, the following description will emphasize the first case, in which the first computing device 104 differs from the second computing device 108.

The first and second computing devices (104, 108) may correspond to user devices that perform computing functions. The computing devices (104, 108), for instance, may be selected from any of: a desktop computing device, a game console, a set-top box device, a laptop computing device, a netbook-type computing device, a tablet-type computing device, a smartphone or other cellular telephone device, a personal digital assistant device, a music-playing device, an electronic book-reader device, a portable game-playing device, a wearable computing device, a smart appliance device, and so on. In the following, it will be assumed that the same user interacts with the first computing device 104 and the second computing device 108 at different respective times. But this need not be the case; for example, one person may suspend her interaction with an application on the first computing device 104 and then instruct another person to resume interaction with the same application on the second computing device 108. Further, instances of the application can be resumed on two or more computing devices, based on the state captured by the first computing device 104.

The first computing device 104 uses a first execution (i.e., runtime) environment 112 to run the application, while the second computing device 108 uses a second execution (i.e., runtime) environment 114 to run the application. The execution environments (112, 114) may correspond to browsers installed on the respective computing devices (104, 108). In another case, one or more of the execution environments (112, 114) may correspond to any functionality that is designed to run web-enabled applications, where that functionality does not correspond to a browser per se. For example, one or more of the execution environments (112, 114) may correspond to a standalone JavaScript® interpreter.

In one implementation, the first execution environment 112 uses the same type of platform as the second execution environment 114. For example, both execution environments (112, 114) may correspond to the Internet Explorer® (IE) browser provided by Microsoft Corporation® of Redmond, Wash. In another case, the first execution environment 112 differs from the second execution environment 114; for example, the second execution environment 114 may correspond to the Mozilla® Firefox® browser, whereas the first execution environment 112 may correspond to Microsoft's IE browser.

FIG. 1 further shows that both computing devices (104, 108) retrieve an instance of the application from a remote application source 116. The remote application source 116 may correspond to a remote server, or a collection of remote servers. Each computing device may access the remote application source 116 by specifying a network address (e.g., a Uniform Resource Locator) associated with the remote application source 116. More generally, the computing devices (104, 108) can obtain the code associated with the application from any source or combination of sources, any of which may be local or remote with respect to the computing devices (104, 108).

In one case, an application source may provide code associated with a single particular application. Hence, in that case, the computing devices (104, 108) will interact with different application sources to run different respective applications. In another case, an application source may provide code associated with two or more applications.

In the examples which are emphasized herein, the application corresponds to what is colloquially referred to as a web application. The web application can provide any functionality which executes any task (such as by sending and receiving Emails, etc.). Alternatively, the web application may serve the primary purpose of delivering information (such as by displaying blog entries, etc.). In many cases, the web application may be implemented as a collection of HyperText Markup Language (HTML) resources, style sheet resources (such as Cascading Style Sheet resources), and behavior-executing resources (such as JavaScript® resources). A browser downloads these resources from any application source(s), such as the remote application source 116. The user then interacts with the application via an execution environment (e.g., a browser). But more generally, the application may correspond to any program that is designed to execute within any high-level execution environment (such as a browser).

Figure 4:
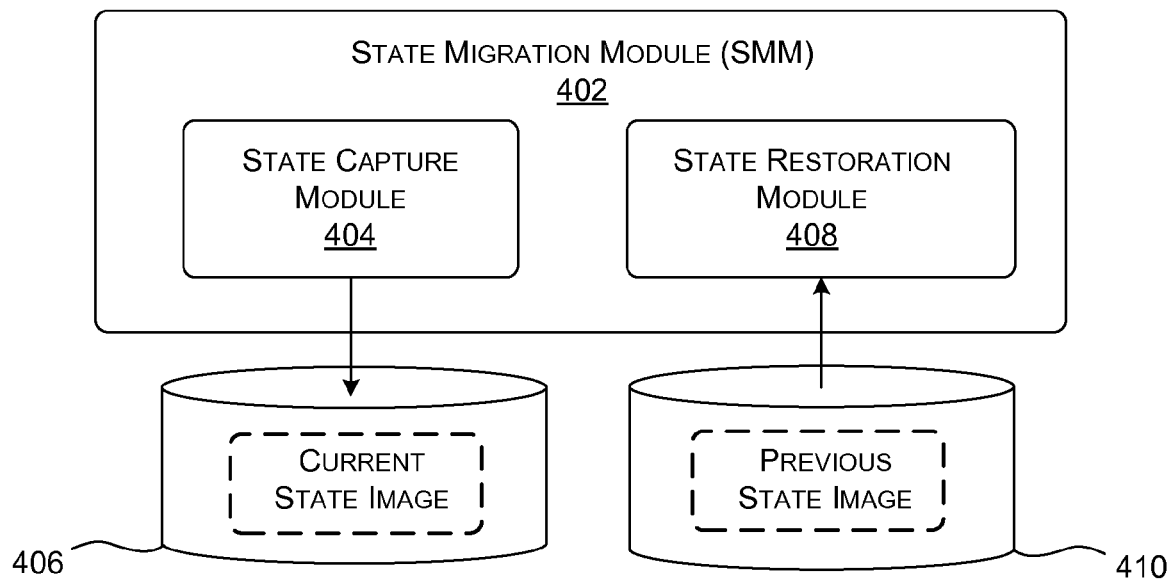
FIG. 4 shows one implementation of the SMM used in FIG. 1. The SMM includes a state capture module for capturing current state, and a state restoration module for resuming an application based on a previous state.

The first execution environment 112 further includes (or otherwise has access to) a first instance 118 of a state migration module (SMM), while the second execution environment 114 includes (or otherwise has access to) a second instance 120 of the SMM. Jumping ahead momentarily in the sequence of figures, FIG. 4 is a high-level logical depiction of a SMM 402. The SMM 402 implements two basic functions; it performs one of these functions, at a given time, depending on the context in which it is invoked. A state capture module 404 performs the first function by capturing the current state of an application at a specified time. In most of the examples presented here, the specified time corresponds to the time that a user suspends his or her interaction with the application, e.g., by navigating away from the application, closing the browser down, etc. In other case, a user may expressly instruct the state capture module 404 to store the current state of the application, but the user may continue to interact with the application. In any case, the state capture module 404 expresses the current state as a current state image, and stores the current state image in a destination data store 406.

A state restoration module 408 performs the second function by retrieving a previous state image from a destination data store 410. The previous state image corresponds to a current state image that was created by the state capture module 404, at some earlier time. The state restoration module 408 then restores the application to a state that is expressed by the previous state image.

Returning to FIG. 1, the first instance 118 of the SMM 402 invokes its state capture module 404 to store the current state of the application. This operation yields a current state image 122, which reflects the state of the application at a time $t_0$. The first instance 118 of the SMM 402 may store the current state image 122 in a local data store 124, or a remote data store 126, or both the local data store 124 and the remote data store 126. A migration management module (MMM) 128 may manage the storage and retrieval of state information in the remote data store 126, among other management functions. In one case, the MMM 128 and the remote data store 126 are administered by an entity associated with a particular application. In another case, the MMM 128 and the remote data store 126 provide a service for use by plural applications, or all applications.

At some time $t_1$, later than $t_0$, the second instance 120 of the SMM 402 invokes its state restoration module 408. More specifically, assume that the second computing device 108 is different than the first computing device 104. In that case, the second instance 120 of the SMM 402 may retrieve the current state image 122 from the remote data store 126. Alternatively assume that the second computing device 108 is the same as the first computing device 104. In that case, the second instance 120 of the SMM 402 can retrieve the current state image from a local data store 130, which, incidentally, is the same as the local data store 124. Alternatively, the second instance 120 of the SMM 402 can retrieve the current state image 122 from the remote data store 126, providing that it has been stored there. For example, in some same-device resumption scenarios, an application provider and/or user may prefer to store (and later retrieve) the current state image 122 from the remote data store 126 for any number of reasons, e.g., based on a perception that the remote data store 126 is more secure and/or immune to corruption compared to the local data store 124. In other environments, the application provider and/or the user may reach the opposite conclusion, thus preferring to store the current state image 122 in the local data store 124. (To repeat, however, so as to not unduly complicate the following explanation, it will henceforth be mostly assumed that the second computing device 108 differs from the first computing device 104, in which case the second instance 120 of the SMM 402 will retrieve the current state image 122 from the remote data store 126.) The second instance 120 of the SMM 402 may then use its state restoration module 408 to restore the application to its suspended state, based on the state information imparted by the current state image 122 (which now may be referred to as a previous state image). The user may then continue to interact with the application using the second computing device 108.

From a user experience perspective, the user will perceive the application to resume at the second computing device 108 at the same juncture that it was interrupted at the first computing device 104. For example, if the user was playing a game, the action presented by the game, the score status of the game, and all other facets of the state of the game will resume from that juncture at which the game was suspended at the first computing device 104.

One or more networks 132 communicatively couple the above-described components together. The network(s) 132 may correspond to a local area network, a wide area network (e.g., the Internet), point-to-point connections, etc., or any combination thereof.

Finally, FIG. 1 annotates certain paths within the environment 102 with numbers, reflecting one illustrative and non-limiting sequence of operations. Other implementations can vary one or more aspects of the illustrated sequence of operations, such as by omitting one or more specified steps, and/or adding one or more new steps, changing the order of one or more specified steps, etc.

In a first operation (1), the first computing device 104 receives the first instance 106 of the application from the remote application source 116. As will be clarified shortly, the first instance 118 of the SMM 402 can be received as a library module, along with the first instance 106 of the application. Hence, in this scenario, the execution environment 112 receives the first instance 118 of the SMM along with the first instance of the application as a result of the first operation (1). In another implementation, the first instance of the SMM 402 represents an already-present component of the first execution environment 112, e.g., corresponding to a stable resource of the first execution environment 112.

More specifically, in operation (1), the first execution environment 112 can request the desired application from the application source 116. Some entity within the environment 102 can then determine whether a previous state image exists with respect to the particular application under consideration, and with respect to the particular user under consideration. Assume here that no such previous state image exists. If so, then the application source 116 can deliver the application without any reference to a previous state. The entity which performs the above-described state-checking operation may correspond to the application source 116, the MMM 128, the first execution environment 112, etc., or any combination thereof.

In operation (2), the first instance 118 of the SMM 402 captures the current state at time $t_0$. Time $t_0$ may correspond to the point in time at which the user has suspended the operation of the application. The SMM 402 then stores the corresponding current state image 122 in the remote data store 126, and/or, per operation (2'), in the local data store 124.

As part of operation (2), the SMM 402 can also store information that indicates that the current state image 122 now exists. For example, the SMM 402 can store a cookie or the like in the local store 124 of the first computing device 104 that identifies the existence of the corresponding current state image 122. In addition, or alternatively, the SMM 402 can store an entry at the application source 116 and/or at the MMM 128 which indicates the existence of the current state image 122 (for a particular application, and for a particular user). The state-checking operation may later make reference to the above-described information to determine the existence or non-existence of the current state image 122, for a particular application and for a particular user under consideration.

In operation (3), the second execution environment 114 of the second computing device 108 initiates the resurrection of the second instance 110 of the application. For example, in response to the user's invocation of the application, the second execution environment 114 may request the application from the application source 116. Some entity within the environment 102 (e.g., the application source 116, the MMM 128, the second execution environment 114, etc.) can then perform the same state-checking operation described above. For example, the application source 116 can make this determination based on a local cookie stored on the second computing device 108 and/or based on remotely stored information maintained by the application source 116 and/or the MMM 128, etc. In this scenario, the application source 116 will determine that the current state image 122 exists (which at this juncture, may be regarded as a previous state image).

In operation (4), the second execution environment 114 starts the application based on the current state image 122, rather than starting the application anew without reference to prior state. The second execution environment 114 can perform the above task in different ways. Without limitation, in one non-limiting approach, the application source 116 may deliver an application stub to the second execution environment 114, or otherwise make the application stub available to the second execution environment 114. The second execution environment 114 may first use information provided by the application stub to instantiate the second instance 120 of the SMM 120. Alternatively, as stated above, the second execution environment 114 may already contain the second instance 120 of the SMM 402 as a stable resource. The application stub may also provide information that allows the second instance 120 of the SMM 402 to access the current state image 122. For example, the application stub may contain a pointer to the current state image 122. The second instance 120 of the SMM 402 can use the pointer to retrieve the current state image 122 from the remote data store 126 and/or the local data store 130. In another case, the application stub may itself contain a copy of the current state image 122. In whatever manner obtained, the second instance 120 of the SMM 402 then restores the state of the application based on the current state image 122.

From a high-level standpoint, the SMM 402 used in FIG. 1 captures and restores the state of the application with respect to the execution of the application in the execution environment (such as the execution environments (112, 114)), not with respect to the operation of all functions performed by an underlying computing device on which the applications run. For example, the SMM 402 captures and restores the state of the application without taking into account the low-level details of the manner in which the execution environment interacts with the underlying operating system and core hardware resources of the computing device. Hence, the SMM 402 operates on a higher level of abstraction compared to the hardware or operating system interface provided by the computing device which runs the SMM 402.

The SMM 402 can express the state of an application relative to the operation of a high-level execution environment by leveraging the isolation-related characteristics of the high-level execution environment. Consider, for instance, the concrete example in which an execution environment corresponds to a browser, designed primarily to run web applications. A modern browser will typically not give an application unencumbered access to the core resources of the underlying computing device, at least not in the same manner as that a traditional application is permitted to interact with the resources, via the operating system. In other words, to promote security and other objectives, the browser operates in a more restricted domain of trust compared to applications which run in a traditional manner on the computing device. The SMM 402 leverages the isolation provided by the browser to define a baseline state of the application as it appears to the browser, not the entire underlying computing device. For instance, the current state, as captured by the SMM 402 does not take into account how the browser itself interacts with the operating system of the underlying computing device.

A number of benefits may ensue from the above characteristic of the SMM 402. For example, the current state image 122 may have a much smaller size compared to a state which describes the overall operation of the underlying computing device. For instance, the current state image 122 may have a much smaller size compared to the images produced by a traditional virtual machine mechanism. Second, as a related benefit, the SMM 402 can create, transfer, and restore the current state image 122 in a more efficient manner compared to the much larger images produced by a traditional virtual machine mechanism. For example, a computing device can quickly transmit the current state image 122 over many types of commercial communication links (such as a cellular link); it would not be possible to do the same with respect an image created by a traditional virtual machine mechanism. Third, the current state image 122 is less complex compared to an image created by a traditional machine mechanism. Being less complex, the current state image 122 may be less apt to incorrectly represent the state of the application, e.g., by failing to take account for a dependency that impacts the restoration of the application.

Finally, the SMM 402 may be implemented as code that runs on an execution environment (e.g., a browser) in the same manner as any other library module. This characteristic facilitates deployment and management of the SMM 402. In contrast, a traditional virtual machine mechanism uses a hypervisor (or the like) to properly capture the state of an underlying computing device. Further, in some implementations, the environment 102 can deploy the SMM 402 without asking the user to perform a manual modification of the execution environment. As stated above, however, in other cases, the SMM 402 may represent a stable resource of an execution environment, e.g., produced by adding a new module to the execution environment.

The above potential benefits are cited by way of example, not limitation; the SMM 402 may provide additional benefits not mentioned above.

Figure 2:
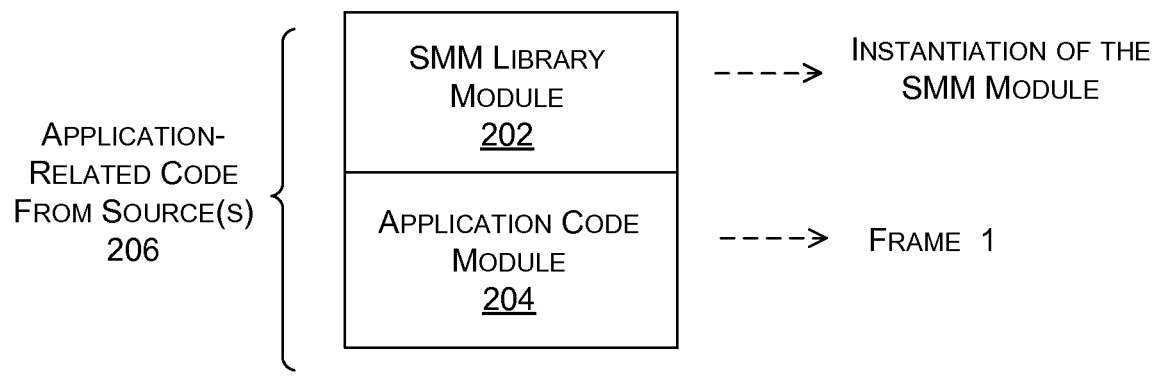
FIG. 2 shows one manner of delivering a state migration module (SMM) to a computing device. The SMM is a component of the environment of FIG. 1.

FIG. 2 illustrates an embodiment in which the SMM 402 corresponds to a SMM library module 202, e.g., corresponding to code that implements the SMM 402, organized into one or more code units. An execution environment runs the SMM library module 202 to yield an instantiation of the SMM 402. The functions of the application itself are implemented by an application code module 204. An execution environment runs the application code module 204 to yield an instance of the application. The SMM library module 202 and the application code module 204 collectively correspond to application-related code 206.

In one case, the application source 116 may provide both the SMM library module 202 and the application code module 204. In another case, the migration management module (MMM) 128 may provide the SMM library module 202, and the application source 116 may provide the application code module 204. In another case, the MMM 128 may provide the SMM library module 202 to the application source 116, which, in turn, provides it the execution environment, and so on.

In one case, at least one source provides the SMM library module 202 and the application code module 204 to the execution environment as a single package. In another case, any source provides the SMM library module 202 to the execution environment, and then the same source, or a different source, provides the application code module 204 to the execution environment, or vice versa.

The principles set forth above can be implemented in different ways in different technical environments. In one illustrative and non-limiting implementation of FIG. 1, assume that the execution environments (112, 114) are a browsers. In that case, the application may be implemented by a single module of JavaScript® code that is associated with a single origin. The application-defined code may reside within a single HTML frame. The SMM module 402 may be represented by a JavaScript® library that also runs in that frame, and obtained from the same source as the application-defined code or a different source. Alternatively, as noted above, the SMM module 402 may be implemented by the browser itself. Generally, a frame corresponds to an execution context in which code runs, and is henceforth referred to in that generic sense.

In another case, the application may correspond to a conglomerate of application code modules associated with different domains. The execution environment may run the different code modules using different respective frames. For example, consider the case in which the application corresponds to a web application. That application aggregates together two or more separate services implemented by different code modules. The different code modules may originate from different respective application source(s), or, at least in part, the same application source. For example, a "main" application code module may deliver a social network service to a user. The user may interact with that service via a main section of a user interface presentation provided by the application. A second application code module may deliver ads to the user. The user may interact with that supplementary service via a peripheral region of the user interface presentation.

Figure 3:
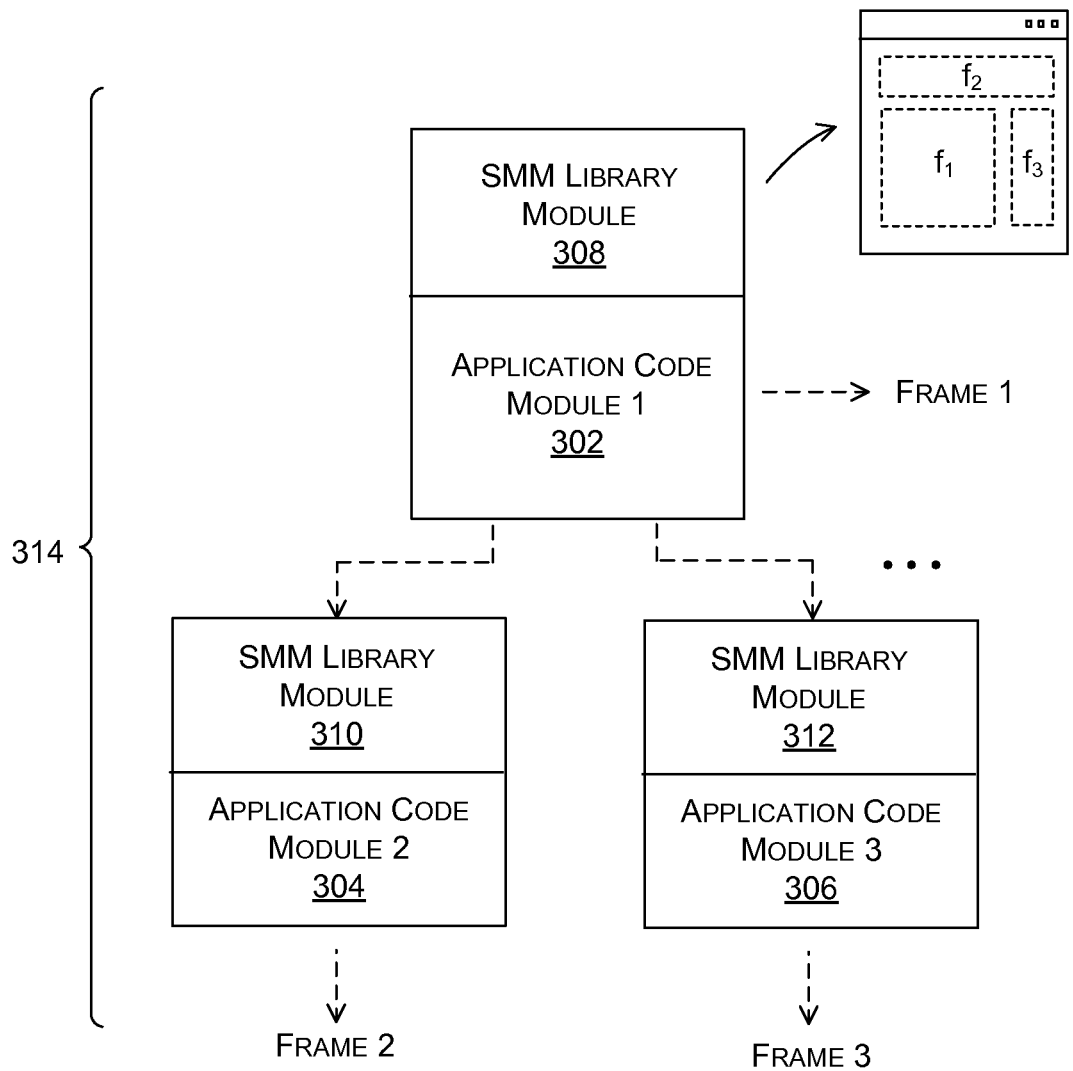
FIG. 3 shows an extension of the implementation of FIG. 2, addressing the case in which the application includes two or more application modules associated with respective frames.

FIG. 3 shows an implementation of an application that provides a user experience to the user via three application code modules (302, 304, 306). The execution environment (in this example, a browser) runs the three application code modules (302, 304, 306) in three respective frames (frame 1, frame 2, and frame 3). Each frame constitutes an independent domain having a state that is independent of the state of other frames. Hence, the SMM 402 captures the state of this kind of application by separately capturing the state of each independent frame. The use of three application code modules (302, 304, 306) and associated frames is merely representative; an application can include any number of application code modules.

To capture the state on a frame-specific basis, the environment 102 can associate a first SMM library module 308 with the first application code module 302, a second SMM library module 310 with the second application code module 304, and a third SMM library module 312 with the third application code module 306. The collection of application code modules (302, 304, 306) and SMM library modules (308, 310, 312) collectively correspond to application-related code 314. Each library module can be provided to the execution environment in any manner specified above with respect to the single-frame example of FIG. 2.

Each SMM library module instantiates a version of the SMM which is responsible for capturing and restoring the state associated with a particular application code module. That is, the first SMM library module 308 captures and stores state information with respect to the first application code module 302, the second SMM library module 310 captures and restores state information with respect to the second application code module 304, and the third SMM library module 312 captures and restores state information with respect to the third application code module 305. Further, the SMM library module 308 may serve as a top-level instance of the SMM 402 for the entire application. When invoked, the top-level SMM library module 308 performs its SMM-related functions with respect to the application code module 302, and can also instruct the other SMM library modules (310, 312) to perform their SMM-related functions with respect to their respective application code modules (304, 306). But all the library modules (308, 310, 312) otherwise perform their operations in an independent manner (because the state of the frames are themselves independent).

To simplify the following explanation, the remaining description will assume that the application is made up of a single application module, associated with a single frame (in other words, a single execution context). But the same processing operations laid out below can be duplicated by plural library modules with respect to plural frames of an application. As a further simplifying assumption, the description will consider the scenario in which each frame is single-threaded, meaning that only one call chain is active at any given time (so that plural threads are not changing the state of the application in parallel).

Figure 5:
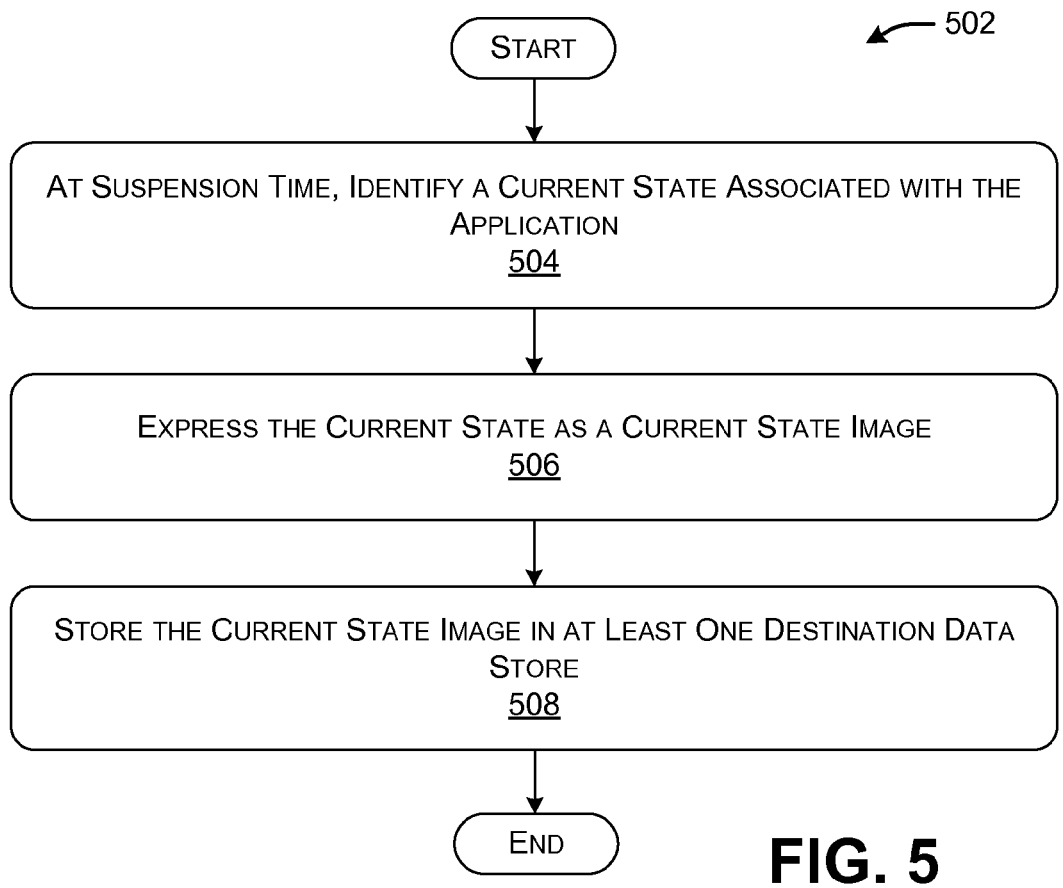
FIG. 5 shows a process which provides an overview of one manner of operation of the state capture module of FIG. 4.
Figure 7:
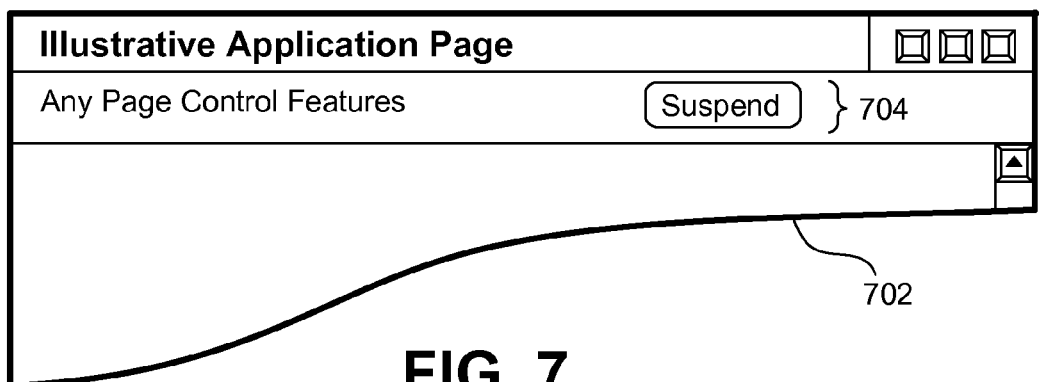
FIG. 7 shows a fragment of a user interface presentation, depicting an optional control mechanism that can be used to expressly suspend an application and store the current state of the application.

In conclusion to this introductory section, FIG. 5 shows a process 502 which summarizes the operation of the state capture module 404 of the SMM 402. In block 504, the state capture module 404 identifies the current state associated with application. In one case, block 502 is triggered by the user's decision to close down the application, e.g., by navigating away from a web-enabled application (e.g., by closing a tab assigned to the application), or by closing down the entire browser. In another case, the user may expressly instruct the state capture module 404 to capture the state of the application. For instance, in the scenario of FIG. 7, a user interface presentation 702 provided by the application presents a suspend control button 704 or the like. The user may activate that control button 704 to instruct the state capture module 404 to identify the current state. That instruction may or may not coincide with an instruction to shut down the entire application.

In block 506, the state capture module 404 expresses the identified state as a current stage image. In block 508, the state capture module 404 stores the current state image in at least one destination data store, such as the local date store 124 and/or the remote data store 126. The state capture module 404 also locally and/or remotely stores an indication that the current state image has been created. Section B provides further illustrative detail regarding the operation of the state capture module 404.

Figure 6:
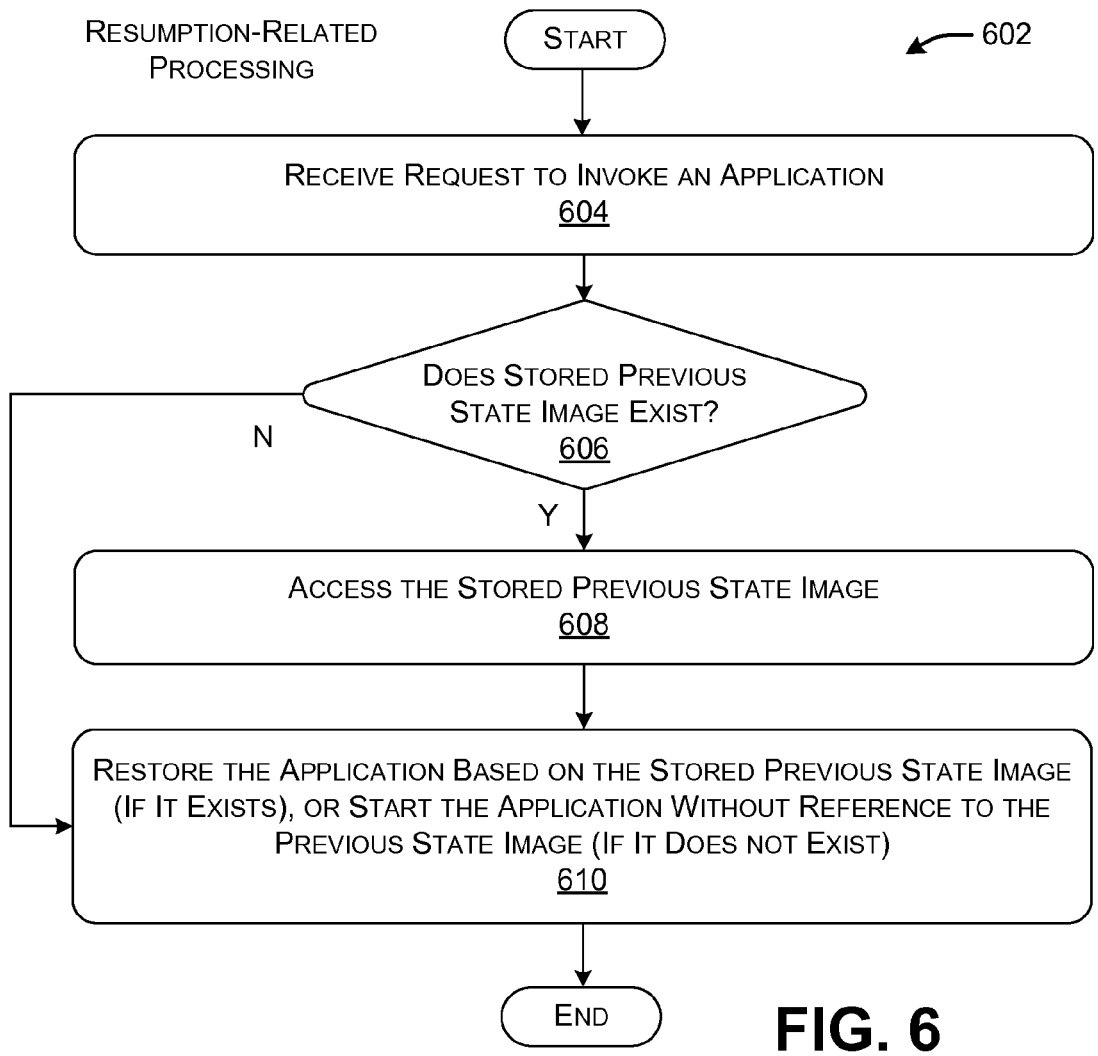
FIG. 6 shows a process which provides an overview of one manner of operation of the state restoration module of FIG. 4.

FIG. 6 shows a process 602 which summarizes the manner in which the environment 102 may restore the state of an application. In block 604, a request is received (e.g., by the application source 116) to invoke an application. In block 606, some entity within the environment 102 (such as the application source 116) determines whether a previous state image exists for the application. The entity can detect the existence of the previous state image in different ways, described above.

In block 608, the second execution environment 114 retrieves the previous state image, wherever it is stored. The second execution environment 114 can perform this operation in different ways, described above. In one approach, the second execution environment 114 receives an application stub from the application source 116, which allows it to instantiate the state restoration module 408. The state restoration module 408 then uses information provided by the application stub to retrieve the previous state image. In block 610, the state restoration module 408 restores the state of the application, as captured by the state capture module 404, using the previous state image. The user may then resume the operation of the application from that same juncture at which it was suspended. Section C provides further illustrative details regarding the operation of the state restoration module 408.

B. The State Capture Module

Figure 8:
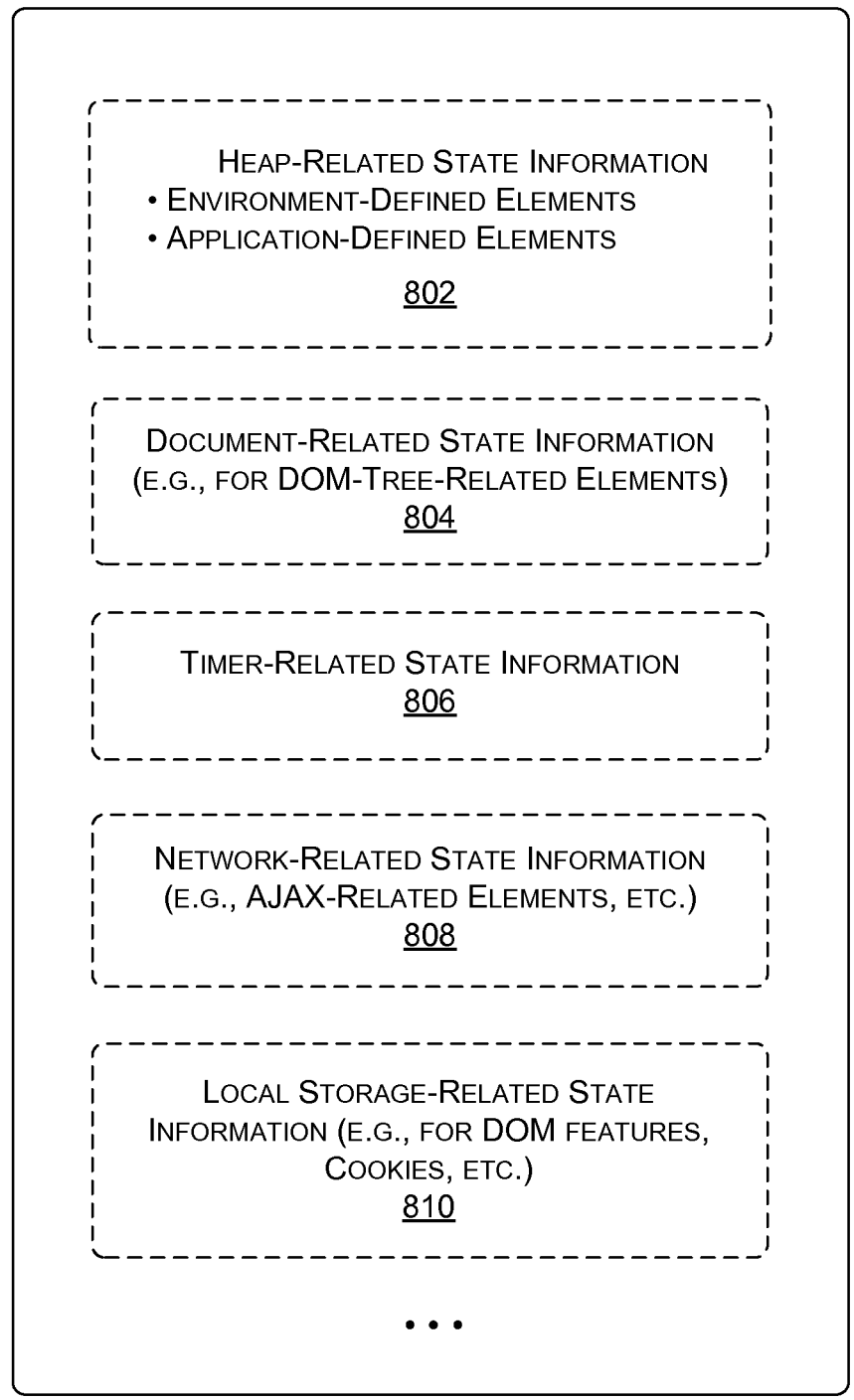
FIG. 8 shows an overview of a current state image produced by the state capture module of FIG. 4.

FIG. 8 shows one implementation of the current state image 122, introduced in Section A. The current state image 122 expresses the state of an application at the time the application was suspended, or at the time at which a state-capture instruction was otherwise received.

The current state image 122 can include different sections which store information regarding different aspects of the application. As to terminology, a particular aspect of the application is referred to herein as a feature of the application. An instance of state information which describes that feature is referred to as an element, or a state element. The state capture module 404 performs two basic tasks with respect to each feature of the application. First, the state capture module 404 uses some technique for detecting its presence and state. Second, the state capture module 404 uses some technique to express the state.

To facilitate explanation, the following explanation will present a detailed example in which the application is written in JavaScript®. JavaScript® is an object-oriented scripting language that is a common feature in many web-enabled applications. However, the SMM 402 can operate on other types of programs expressed in other languages, such as the Python® language. Both JavaScript® and Python® have the ability to discover properties of an application's objects during the application's execution. That capability of the language is referred to as introspection or reflection (where reflection implies the further ability to modify the properties of the objects that are discovered). The SMM 402 can leverage the introspective/reflective capabilities of the programming language in the manner described below.

Figure 11:
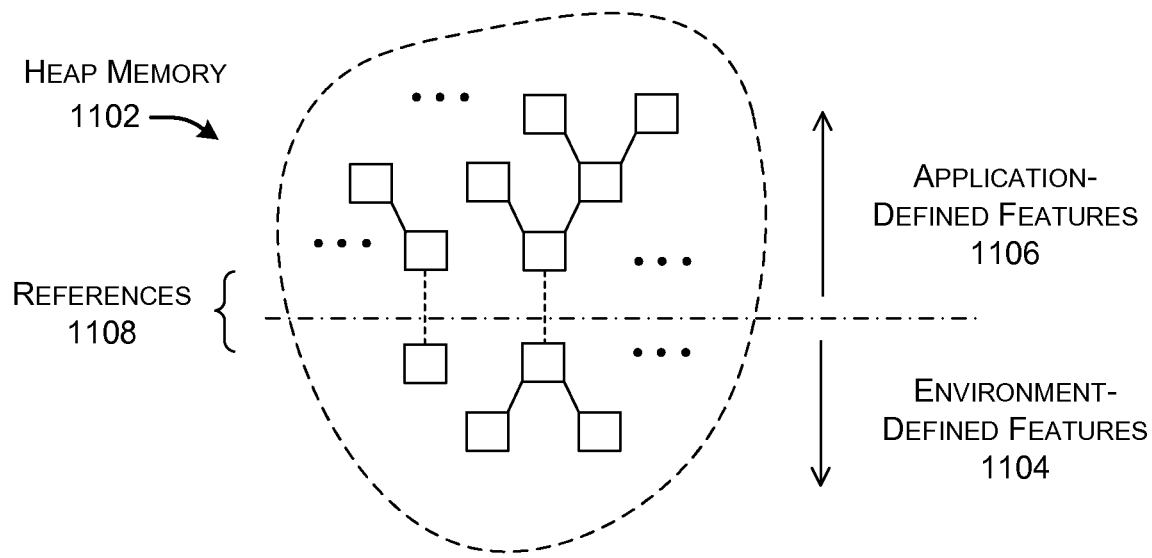
FIG. 11 represents a portion of heap memory, provided by a computing device. The heap memory contains program features produced by the application during execution.

To begin with, the current state image 122 may include heap-related state information 802 which describes heap-related features. As shown in FIG. 11, heap memory 1102 refers to a section of a computing device's main memory that is allocated for storing features invoked by an application, during execution of the application. That is, the features in the heap memory 1102 correspond to instantiations of features defined by the application's code. Each feature in heap memory 1102 may have a set of properties. Each feature may also have a relationship to one or more other features; the heap memory 1102 can represent the relationship among two or more features by expressing the features as nodes within a graph structure. In operation, a loading process stores the features in the heap memory 1102 when they are needed during the execution of the application. A garbage collection process may periodically remove features that are no longer being used by the application.

In the particular and non-limiting case of JavaScript®, the features may include function objects which derive from a prototype function object (referred to as simply "functions" below for brevity) and non-function objects which derive from a prototype non-function object (referred to as simply "objects" below for brevity). More specifically, a subset of the objects and functions may be defined by the application itself, and are hence referred to below as application-defined objects and application-defined functions. Another subset of objects and functions are defined by the execution environment that runs the application (e.g., the browser), and are hence referred to below as environment-defined objects and environment-defined functions. The execution environment and the application can also define "primitive" values, such as numbers and Boolean values. Hence, the heap memory 1102 may contain primitive values in addition to function values and object values.

More specifically, consider the state of the heap memory 1102 before the application executes. The heap memory 1102 will contain only the environment-defined features 1104. The environment-defined features 1104 correspond to common resources that any application may use to provide its services. For example, some environment-defined features may provide functionality that allows an application to interact with a remote entity, etc. The environment-defined features 1104 may, in actual practice, correspond to paths that identify respective resources, rather than the resources per se.

Subsequently, the application loads application-defined features 1106 into the heap memory 1102 when the application executes and requires use of those features. The application-defined features 1106 correspond to objects and functions which are particular to the application that is running. Some of the application-defined features may make reference to the environment-defined features, as reflected by the references 1108 shown in FIG. 11.

Returning to FIG. 8, a first set of heap-related elements may describe environment-defined objects and functions. A second set of heap-related elements may describe application-defined objects and functions. As will be described below, the state capture module 404 may use different techniques to identify and express the environment-defined features, compared to the application-defined features.

As noted above, the environment-defined features reflect functionality that may be used by any application, and is thus common across different browsers. It thus may appear possible to omit this information when capturing the state of the application itself. However, the applications may affect the environment-defined features in differing ways. For example, an application can add functionality to an environment-defined feature, and/or modify a graph of environment-defined features, etc. An application-defined object may also refer to one or more environment-defined objects. The state capture module 404 captures the state of the environment-defined features so as to detect the above type of application-specific references and modifications; otherwise, the state restoration module 408 may not be successful in correctly restoring the state of the application.

In one scenario, the capture-phase execution environment (e.g., the first execution environment 112 shown in FIG. 1) may be the same as the restoration-phase execution environment (e.g., the second execution environment 114 of FIG. 1). For example, both the execution environments (112, 114) may correspond to IE browsers provided by Microsoft® Corporation. In another case, the environments (112, 114) may differ. In the latter case, at the time of restoration, the state restoration module 408 can additionally translate the environment-defined features expressed in the current state image 122 so that they are compatible with whatever native functionality is employed by the target execution environment.

Continuing on with the explanation of FIG. 8, the current state image 122 also includes document-related state information 804, timer-related state information 806, network-related state information 808, and storage-related state information 810. As to the document-related state information, a browser may express the application's markup language information (e.g., its HTML) using the document object model (DOM). The document-related state information 804 describes features associated with a DOM tree. The DOM tree, in turn, represents the application's markup code as a structured collection of nodes. The timer-related state information 806 provides metadata that describes timers that have been registered by the application. The network-related state information 808 describes in-progress network interactions involving the application. And the storage-related state information 810 describes information that has been stored by the application on a local storage device of the computing device, which runs the application. Such information may include cookies, key/value data stored via the DOM storage interface, etc. The above-described types of state information are cited by way of example, not limitation. Other implementations can provide additional types of state information. Alternatively, or in addition, other implementations can omit one or more types of state information described above.

The above-described categories of state information will be described in greater detail below with reference to a specific example of a current state image 902, shown in FIGS. 9 and 10. Further assume that the current state image 902 expresses the state of an application that is written in JavaScript®. To repeat, however, the principles set forth herein extend to other programming languages (such as, but not limited to, Python®, etc.).

Environment-Defined Features.

The state capture module 404 traverses the heap memory 1102 to identify the environment-defined features (e.g., using a graph search, such as a breadth-first search), including environment-defined objects and environment-defined functions. The state capture module 404 assigns and stores a unique identifier for each such feature. The state capture module 404 may express the value of the environment-defined feature as a string, corresponding to a path which references the environment defined object. FIG. 9 shows that the current state image 902 includes a section 904 for storing information regarding environment-defined objects and a section 906 for storing information regarding environment-defined functions. For example, the environment-defined object "window.localStorage" corresponds to a string which expresses a path associated with this object.

Application-Defined Objects.

The state capture module 404 leverage's the introspection/reflection capabilities of JavaScript® (or any other language that is used to express the application) to identify the application-defined objects. More specifically, the state capture module 404 performs a graph search (e.g., a breadth-first search) on graphs containing application-defined objects in the heap memory 1102 to identify the application-defined objects and their properties. Upon discovering an object, the state capture module 404 assigns a unique ID to it. If the state capture module 404 discovers the same object again in its traversal of the information provided in the heap memory 1102, then it will ignore that object (as it has already assigned a unique ID to that object).

In some cases, one object may reference another. For example, one application-defined object may have a property X.Y that refers to another object Z. To address this situation, the state capture module 404 can represent the link between objects in the current stage image 902. For example, assume that object No. 753 refers to object No. 752 through a property c. The current state image 902 provides a reference 908 that memorializes the relationship between these objects, e.g., by storing the ID of object No. 752 in association with the property c.

In one implementation, the state capture module 404 uses the JSON format to express the application-defined objects in serialized form. The JSON standard is described in RFC 4627 and ECMA-404. However, JSON does not provide techniques for serializing native objects and functions. Hence, the state capture module 404 uses custom techniques to express these features, described below.

Overall, the current state image 902 includes a section 910 that stores application-defined objects, and a section 912 that stores application-defined functions. A map 914 describes all of the objects associated with the current state, including the environment-defined objects and the application-defined objects. A map 916 describes all of the functions associated with the current state, including the environment-defined functions and the application-defined functions. Header information 918 describes the starting points of sections 910 and 912.

Application-Defined Native Objects.

A native object refers to an application-defined object which is an instantiation of native functionality provided by a programming language library. For example, one native object may correspond to a RegExp object which represents an instantiation of regular expression functionality provided by JavaScript®. The state capture module 404 can use different class-specific transducers to express these types of objects. For example, consider a native object that expresses a date, based on native functionality provided by the programming language. The state capture module 404 can convert this object to an integer which represents a number of seconds that has transpired, starting from a reference time.

Application-Defined Functions.

The state capture module 404 can use a predefined toString( ) method of JavaScript® to identify the source code associated with an application-defined function. The state capture module 404 can then leverage the language's introspection/reflection capabilities to identify the properties of the application-defined function. For example, in section 912 of the current state image 902, note that the first application-defined function is assigned ID No. 362. That function has an integer property associated with the variable "i". As indicated by the dashed lines, many other state elements in the current state image 902 make reference to the application-defined function No. 362.

The state capture module 404, however, cannot use the above technique, by itself, to discover functions associated with a JavaScript® closure state. More specifically, consider the scenario, shown in FIG. 12, in which an inner function 1202 is embedded or nested in an outer function 1204. Further assume that the inner function 1202 makes reference to a variable (e.g., variable X) that is defined by the outer function 1204. The nested inner function 1202 is an example of a closure. The outer function 1204 establishes a closure-creating scope associated with the closure. The state capture module 404 cannot discover the closure relationship using the above-described toString( ) method; more specifically, that method will only return the source code of the inner function.

Figure 12:
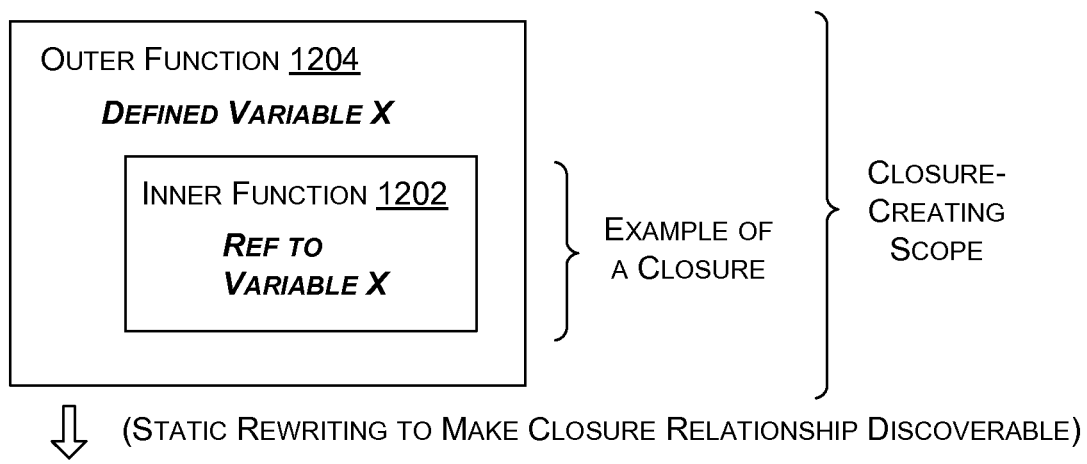
FIG. 12 illustrates one manner by which the state capture module (of FIG. 4) can statically rewrite code so as to make closure variables explicit.
Figure 12:
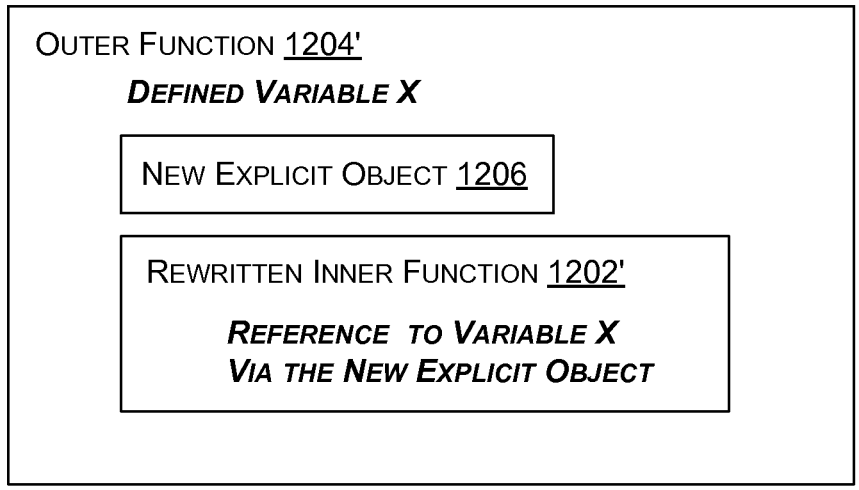

To address the above issue, the state capture module 404 can first identify a closure-creating scope, e.g., corresponding to the nested relationship of functions shown in FIG. 12. The state capture module 404 can then statically rewrite the code shown in FIG. 12, to produce a new inner function 1202' and a new outer function 1204', in such a manner that the closure variables are made explicit. More specifically, the state capture module 404 can create an explicit object 1206 having properties that represent the closure variables. The state capture module 404 rewrites the nested inner function 1202' in such a manner that it is forced to access closure state through the new explicit closure object 1206. More specifically, the state capture module 404 may assign the explicit object 1206 as a function property of the nested inner function 1202'. With the above-described changes, the state capture module 404 is now able to properly discover and express the closure relationship associated with the inner function 1202' and the outer function 1204'.

DOM Tree Features.

As stated above, a browser may use a DOM tree, composed of a structure of nodes, to express the markup code of the application, such as its HTML elements. Each such node has properties which describe the node's characteristics, such as its CSS style, its parent (if any), it children (if any), and so on. Further, the application may associate an event handler with any node in the DOM tree. For example, the application may associate an event handler to detect keyboard or mouse input events that are directed to a particular DOM node. Further still, the application may associate custom properties with any DOM node, e.g., by assigning a custom "<canvas>" property to a node.

The state capture module 404 can assign a unique ID to each DOM node. Further, the state capture module 404 can use existing functionality (e.g., the existing XMLSerializer interface provided by popular browsers) to convert each DOM node to HTML, and to store that HTML as the state element for the DOM node in a section 920 of the current state image 902. But the XMLSerializer functionality does not capture the existence of event handlers and other custom properties associated with nodes.

Figure 13:
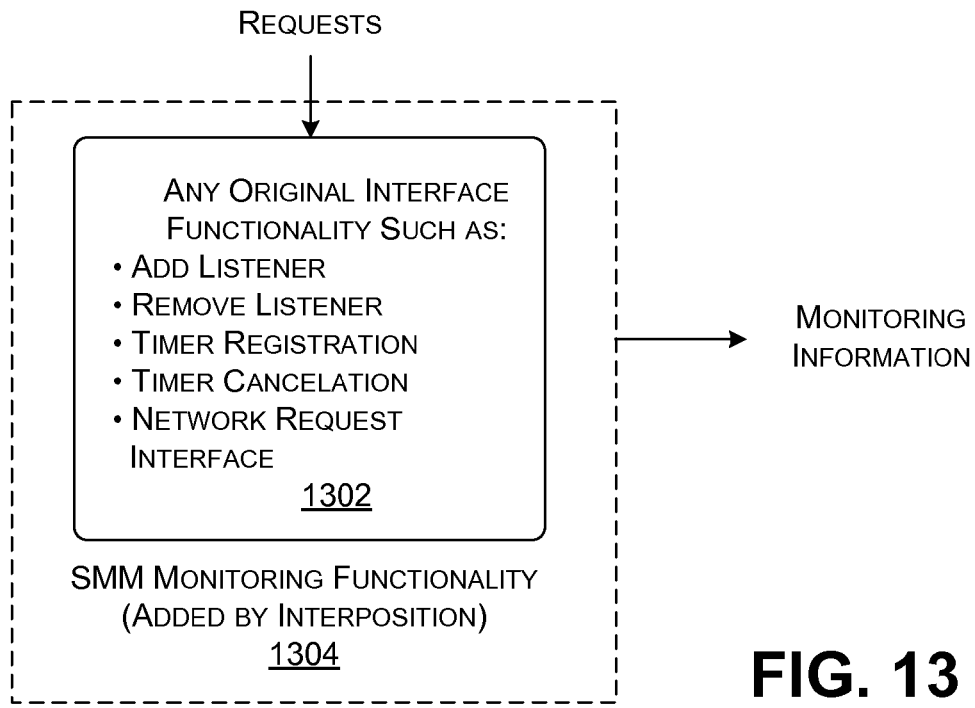
FIG. 13 illustrates one manner by which the state capture module (of FIG. 4) can monitor the manner in which an application creates and removes timers, event handlers, etc.

Advancing momentarily to FIG. 13, first consider the challenge presented by event handlers. Assume that the browser provides original functionality 1302 which registers an event handler. Using an introspection technique, the state capture module 404 can provide monitoring functionality 1304 which detects when an application, in the course of its execution, creates an event handler, to provide monitoring information. The SMM 402 can consult the monitoring information when assessing the state of the application. For instance, the monitoring information may identify the presence of an event handler, which, in turn is associated with a particular function which defines its manner of invocation. The state capture module 404 can serialize that function in the same manner as any other application-defined function.

Figure 10:
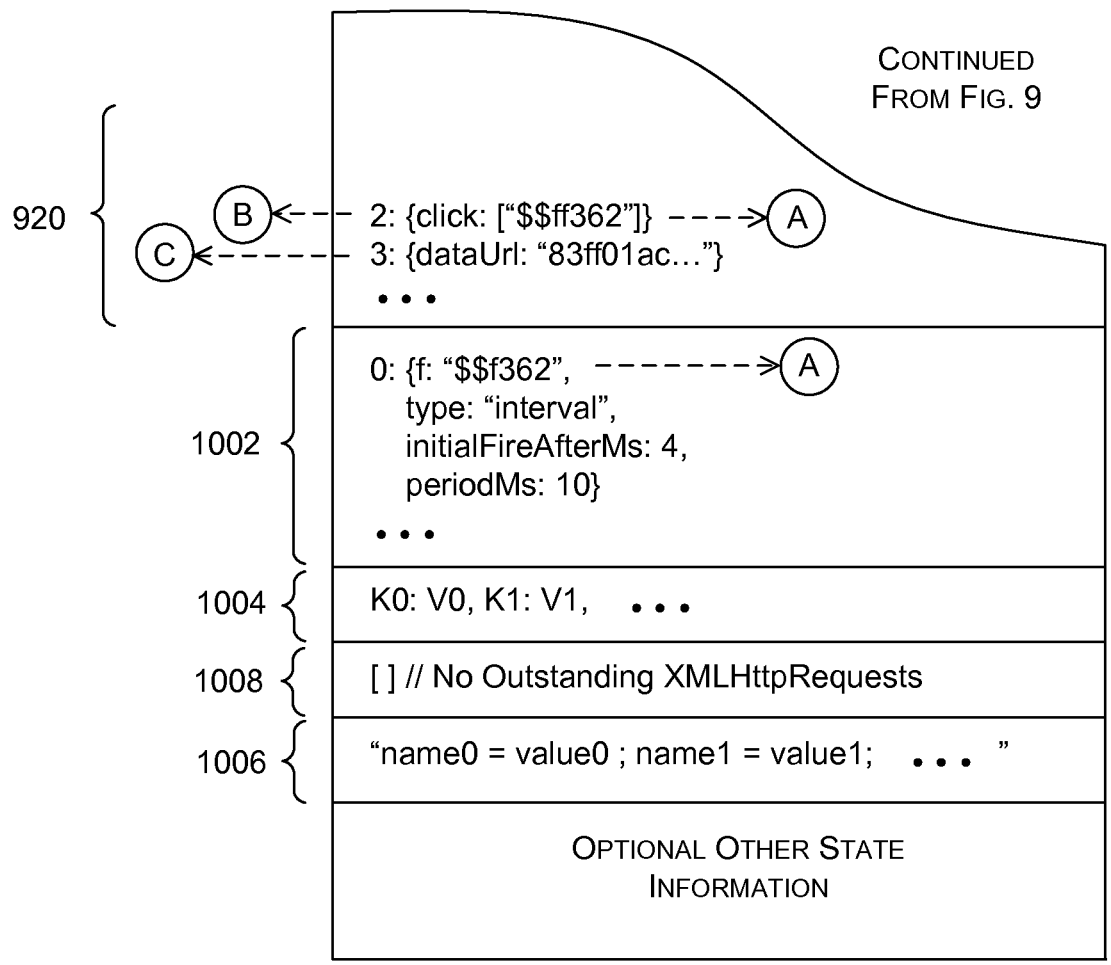

The state capture module 404 can store state information at the end of section 920 (as shown in FIG. 10), which reflects the existence of any event handlers associated with nodes in the DOM tree. For example, FIG. 10 indicates that an event handler is associated with a "div" node, and that this event handler is also associated with application-defined function No. 362.

An application may later remove an event handler, e.g., by passing a reference to the function that is associated with the event handler. The monitoring functionality 1304 of FIG. 13 can also be used to discover the removal of an event handler, e.g., by metaphorically wrapping the event de-registration functionality of the browser with the monitoring functionality 1304. Upon detecting a handler removal event, the monitoring functionality 1304 can remove a corresponding entry from the current state image 902, assuming that the current state image 902 has been previously modified to reflect the existence of the event handler.

As will be described below, and as indicated in FIG. 13, the SMM 402 can apply "interpositioning" to observe other types of state, beyond the creation and removal of event handlers. Generally speaking, the interpositioning process leverages the introspection and reflection capabilities that the execution environment provides. However, the SMM 402 may apply different specific methods of interpositioning for different respective different types of state.

Next consider the challenge presented by custom properties associated with DOM nodes. The state capture module 404 can leverage the application language's introspection/reflection capabilities to discover custom properties associated with DOM nodes. The state capture module 404 can then create references that link the custom properties to the nodes with which they are associated. For example, section 920 of FIGS. 9 and 10 shows that a custom property is linked to a "<canvas>" node. More specifically, the "<canvas>" tag allows an application to create a bitmapped image. Since XMLSerializer does not capture the bitmap, the state capture module 404 may explicitly serialize it and store the resultant data as a string inside the current state image 902. In FIG. 10, the "<canvas>" tag, associated with DOM feature No. 3, expresses the data as the hexadecimal "83ff01ac . . . ".

Timers.

An application can register a timer callback with the execution environment. A timeout-type timer fires once after a specified delay. An interval-type timer repeatedly fires based on a specified periodicity. The state capture module 404 can use the approach shown in FIG. 13 to detect when an application registers a timer. The state capture module 404 can then serialize the associated timer function in the same manner as any other application-defined function. More specifically, interpositioning, as performed on the timer registration interface, may entail saving a reference to the real (native) timer registration operation, and then redefining the registration operation as an operation which logs information about the timer and then calls the original registration operation. (Interpositioning, as performed on the event registration interface, works in the same manner.)

The information that the monitoring functionality 1304 stores includes metadata pertaining to the timer that has been invoked. That metadata can describe the type of timer that has been invoked (e.g., a timeout-type timer or an interval-type timer, etc.). The metadata can also describe the amount of time, following resumption of the application, until the timer will fire. For an interval-type timer, the metadata also describes the periodicity of the timer.

Figure 14:
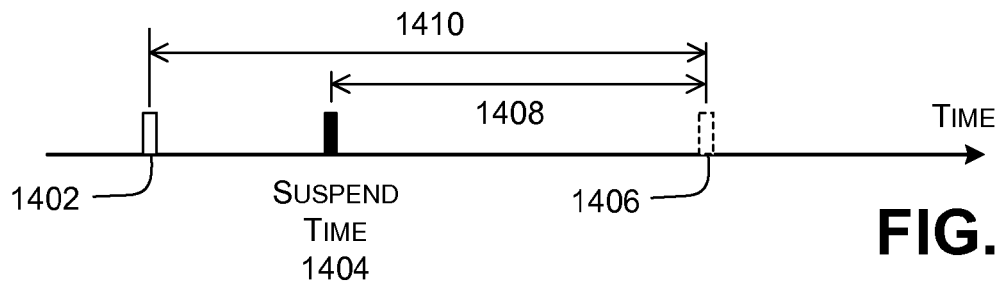
FIG. 14 shows timing information that the state capture module (of FIG. 4) can use to express the state of an interval-based timer.

For example, FIG. 14 shows a timer that last fired at time 1402, or which was initiated at time 1402. Assume that the application was suspended at time 1404. Further assume that the timer was originally scheduled to fire at time 1406, and that a time interval 1408 separates the time 1406 from the time 1404. The state capture module 404 may store the time interval 1408. For an interval-type timer, the state capture module 404 can also store an interval 1410, describing its periodicity. Upon resumption of the application, the state restoration module 408 instructs the execution environment to fire the timer after an amount of time expressed in the interval 1408 has expired, and thereafter repeatedly fire at the periodicity expressed by the time interval 1410.

As shown in FIG. 10, the state capture module 404 can store timer-related state information in a section 1002 of the current state image 902. For example, note that this section 1002 identifies an interval-type timer that is scheduled to fire 4 seconds after resumption, and thereafter at a periodicity of 10 seconds. That timer is furthermore associated with a callback function, corresponding to the application-defined function with ID No. 362.

The timer registration function (that creates the timer) can also provide an integer which expresses a cancellation ID. The application may use the cancellation ID to cancel the timer via a timer cancellation function. The state capture module 404 can also store the cancellation ID. Furthermore, the state capture module 404 can use the monitoring functionality 1304 shown in FIG. 13 to determine when an application has canceled a timer. The state capture module 404 can then remove the corresponding timer state information from the current state image 902, if it has been previously stored.

Furthermore, the state capture module 404 performs its interpositioning on the timer cancellation function in a manner that complements, and takes into consideration, its interpositioning on the timer registration function. By virtue of this approach, the state capture module 404 can ensure that the application's request to cancel a timer is correctly paired up with the identity of timer to be canceled. For example, assume that the monitoring functionality 1304 creates a new reference (e.g., reference Z) to refer to a timer that has been created. But assume that other components of the execution environment refer to the timer using another reference (e.g., reference Y). To address this issue, the state capture module 404 will perform appropriate reference swizzling to ensure that reference Y is translated to reference Z, and vice versa, so that the correct timer is canceled. The state capture module 404 can adopt the same approach with respect to the registration and de-registration of event handlers, to ensure that the correct event handlers are removed upon the application's instructions to do so.

Disk Storage Features.

An application may store information on the computing device's local data store, via a browser, in at least two situations. In a first case, the application can store cookies in the local data store. In a second case, the application can store information using the DOM storage interface; this interface presents a key/value abstraction to the application, and allows an application to store much larger data items than are permitted by the cookie interface. The state capture module 404 can store cookies in string form as name-value pairs. The state capture module 404 can also serialize the DOM storage information in string form as a series of keys and values. In the context of FIG. 10, the state capture module 404 can store the cookie-related state information in a section 1004, and the DOM storage-related state information in a section 1006.

Network-Related Features.

An application may interact with a remote entity (such as another web application, provided by a remote server) via several mechanisms, such as the AJAX interface. In that case, the application can create a new XMLHttpRequest object, which identifies the URL associated with the remote server, and any data associated with the request. The browser then uses the information in the object to contact the remote server. The application can create an event handler for the object; the browser will invoke this handler upon the reception of data from the remote server.

Assume that the user suspends the application in the course of an in-progress network interaction. The state capture module 404 is configured to store state information which expresses the in-flight network connection, and which allows the state restoration module 408 to properly resume the network interaction.

In one technique, the state capture module 404 again uses the type of monitoring functionality 1304 shown in FIG. 13 to "wrap" the interface by which applications create XMLHttpRequest objects. More specifically, the monitoring functionality 1304 may create "wrapper code" for multiple methods and features of an underlying object created through the XMLHttpRequest interface. By doing so, the monitoring functionality 1304 can identify an in-progress network interaction, including the URL associated with the remote server and any network handler defined by the application. The monitoring functionality 1304 can log all such information in a monitoring object. The state capture module 404 can store information pertaining to monitoring objects in a section 1008 of the current state image 902.

Upon a request to restore the application, the state restoration module 408 can extract the state information provided in the current state image 902 (which, at this point, constitutes a previous state image). On the basis of the information in section 1008, the state restoration module 408 determines whether there are any in-progress network interactions. The state restoration module 408 can then restart any aborted network requests using the stored information, e.g., by resending aborted network requests.

In many cases, the application uses a REST-style protocol to implement interaction between clients and servers. In this situation, the remote server is not required to maintain any client-side state; instead, the client is expected to preserve the state information. Applications that use REST protocols can suspend and resume in-progress network connections in the manner specified above, without other special provisions.

Figure 15:
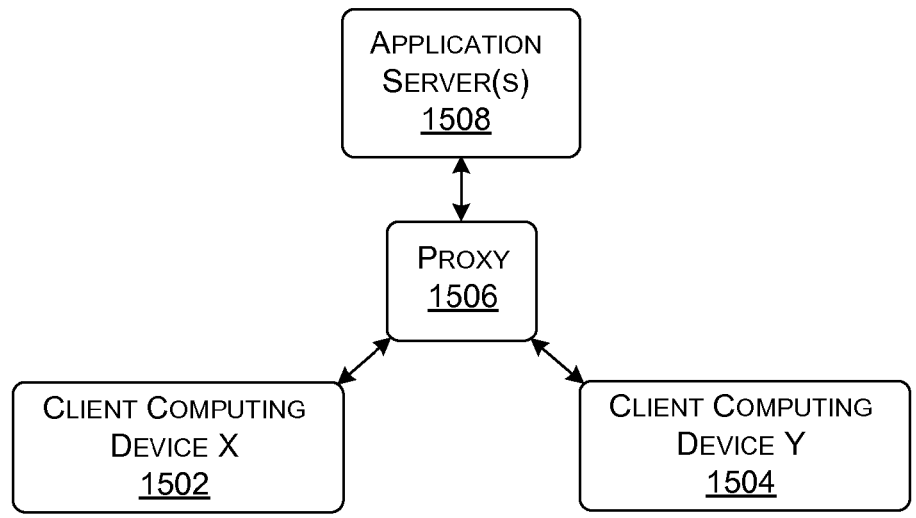
FIG. 15 shows a strategy that involves the use of a proxy to expose a stable endpoint to an application server, despite migration of application state from a first computing device to a second computing device.

In some cases, servers may store session state for a client. For example, assume that a remote server associates each user session with an IP address. Further assume that that the user pauses the application on a first computing device (associated with a first IP address) and resumes it later on a second computing device (associated with a second IP address). Such a situation may complicate the resumption of suspended interactions. The migration functionality can address this case in different ways, such as the strategy shown in FIG. 15. Here, the first computing device 1502 (on which the application is suspended) and the second computing device 1504 (on which the application is restored) are configured to interact with a proxy agent 1506, having a stable IP address. The application server 1508 interacts with the client computing devices (1502 1504) through the stable presence of the proxy agent 1506.

Figure 16:
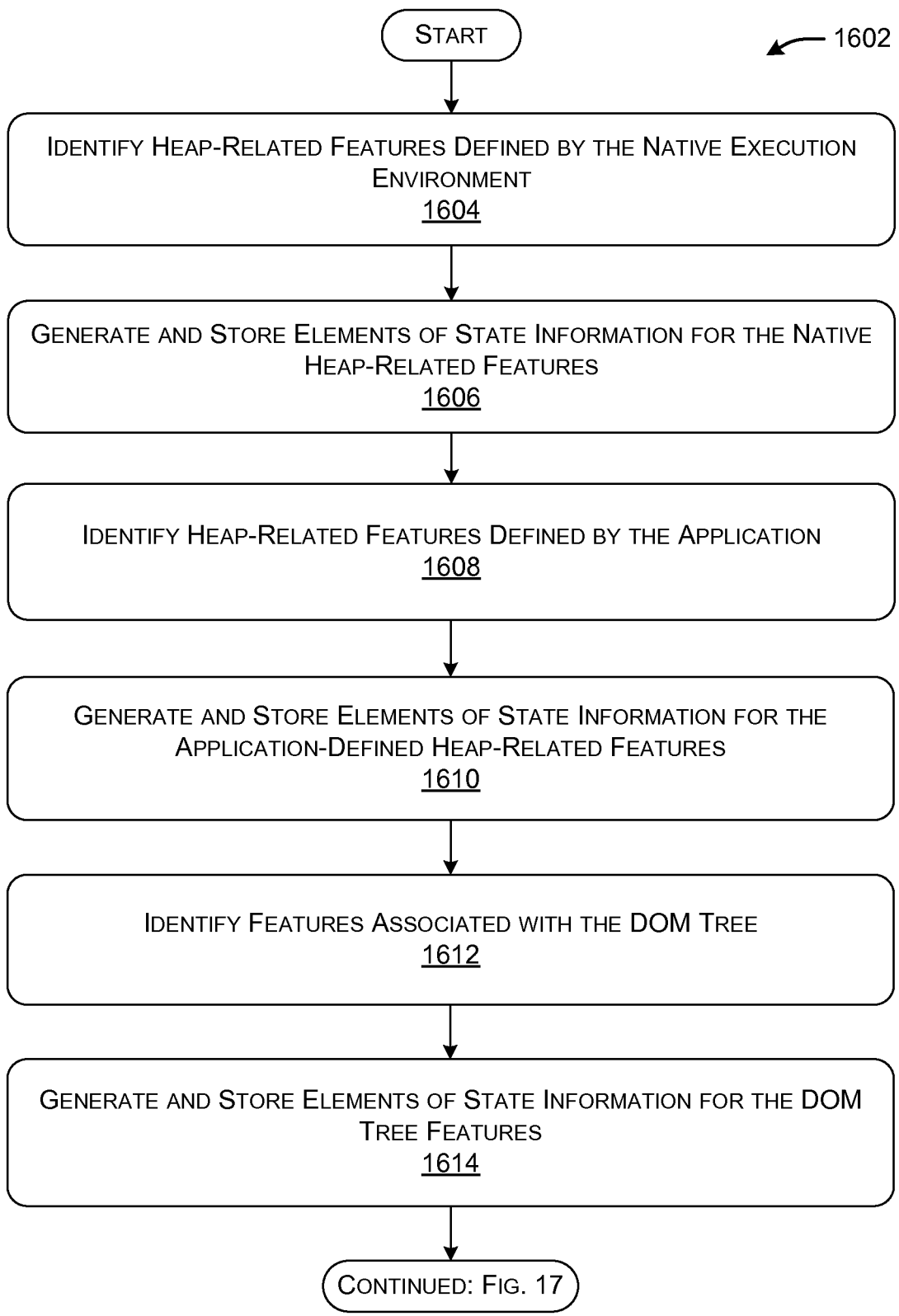
FIGS. 16 and 17 collectively show a process that represents the operation of the state capture module, in more illustrative detail compared to the process of FIG. 5.
Figure 17:
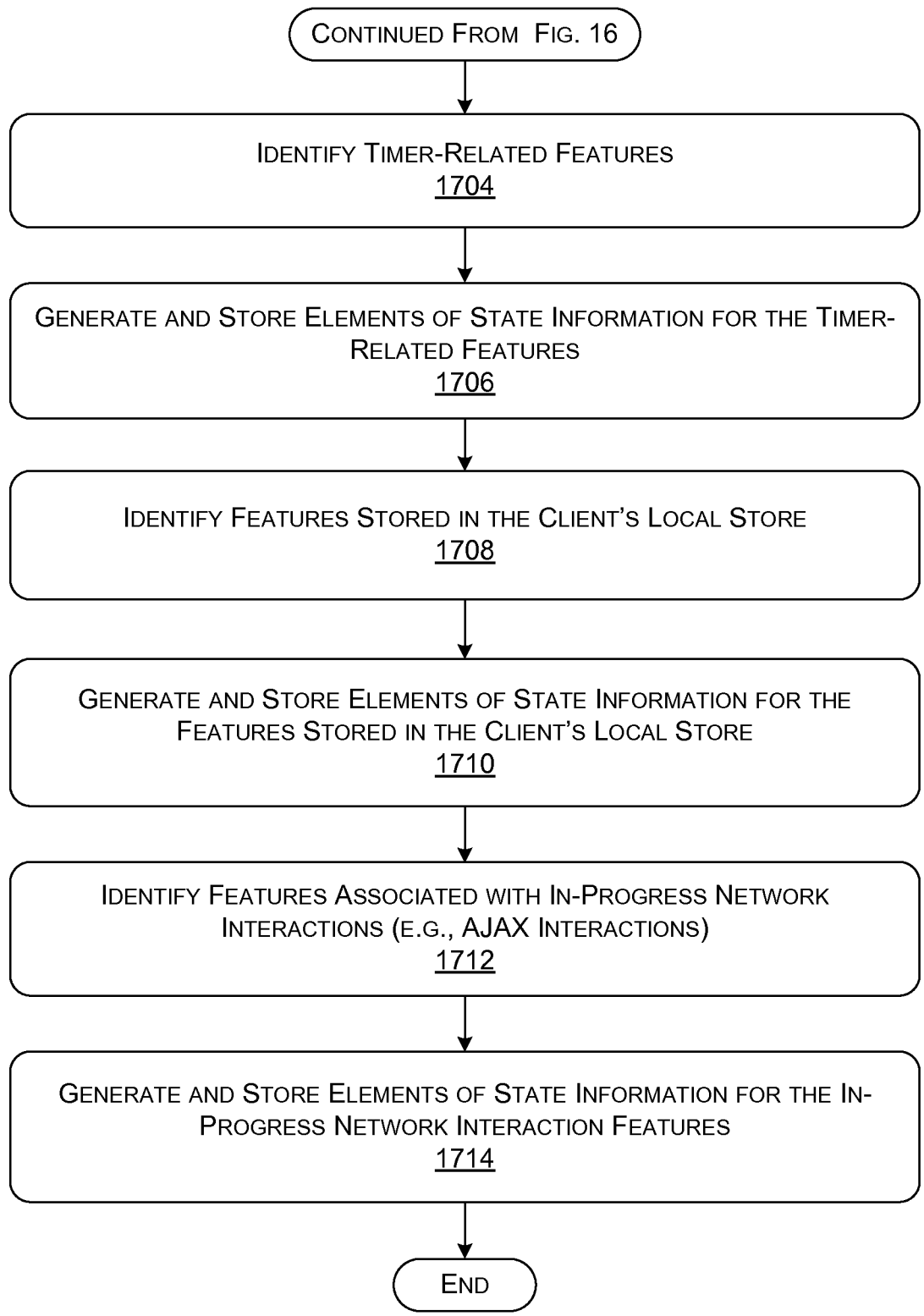

FIGS. 16 and 17 together show a process 1602 which summarizes one manner of operation of the state capture module 404. In block 1604, the state capture module 404 identifies heap-related features (e.g., objects and functions) defined by the execution environment (e.g., the browser). In block 1606, the state capture module 404 generates and stores information which expresses the environment-defined heap-related features. In bock 1608, the state capture module 404 identifies heap-related features (e.g., objects and functions) defined by the application itself. In block 1610, the state capture module 404 generates and stores state information associated with the application-defined heap-related features.

In block 1612, the state capture module 404 identifies features associated with the DOM tree, including event handlers associated with the DOM nodes and other custom properties associated with the DOM nodes. In block 1614, the state capture module 404 generates and stores state information for the DOM tree features.

Continuing on to FIG. 17, in block 1704, the state capture module 404 identifies timer-related features, e.g., associated with different types of timers registered by the application, and/or later canceled by the application. In block 1706, the state capture module 404 generates and stores state information associated with the timer-related features.

In block 1708, the state capture module 404 can identify features associated with information that is stored by the application, via the browser, in the local data store of the computing device. Such information may include cookies, DOM-related information, etc. In block 1710, the state capture module 404 may generate and store state information associated with the local-storage-related features.

In block 1712, the state capture module 404 can identify features associated with in-progress network interactions, such as network interactions which use the AJAX protocol, or some other protocol. In block 1714, the state capture module 404 can generate and store state information associated with the network-related features.

The state capture module 404 can capture the state information described above in a different order compared to that illustrated in FIGS. 16 and 17, including a parallel manner. Further, other implementations of the SMM 402 can identify and store other types of state information, compared to the types of state information identified in FIGS. 16 and 17. Hence, the process 1602 described in FIGS. 16 and 17 is to be interpreted in the spirit of illustration, not limitation.

C. The State Restoration Module

Figure 18:
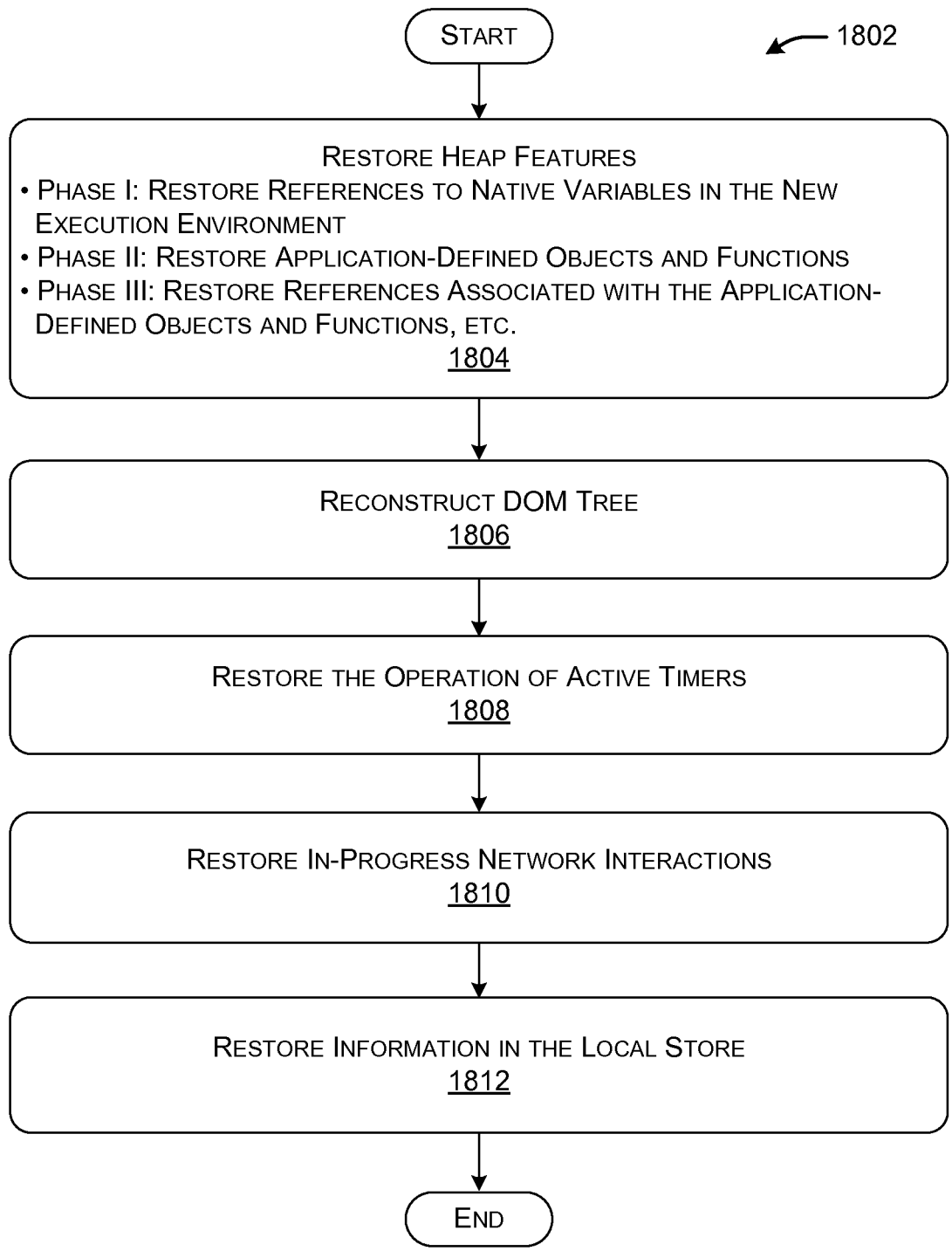
FIG. 18 shows a process that represents the operation of the state restoration module, in more illustrative detail compared to the process of FIG. 6.

FIG. 18 shows a process 1802 that represents one manner of operation of the state restoration module 408 of FIG. 4. Generally, the state restoration module 408 can resume the application based on the previous state image. The previous state image corresponds to the current state image that was created at the time that the application was suspended, but it now qualified as "previous" to reflect its role in restoring the application to its previous state. To repeat, the SMM 402 may invoke the state restoration module 408 on a different computing device compared to the device on which the application was suspended. In this case, the state restoration module 408 may retrieve the previous state image from the remote data store 126. In another case, the state restoration module 408 may resume the application on the same computing device on which the application was suspended. In that case, the state restoration module 408 can retrieve the previous state image from the local data store 130 (and/or the remote data store 126).

In block 1804, the state restoration module 408 restores the heap-related features described in the previous state image. More specifically, in a first phase, the state restoration module 408 creates an initially empty frame containing the environment-defined objects and functions. The state restoration module 408 then traverses the graph of environment-defined objects and functions in the previous state image, assigning each one a unique object ID or function ID, respectively.

In the second phase, the state restoration module 408 can restore the application-defined objects and functions based on the information provided in the object map 914 and the function map 916. For example, the state restoration module 408 can use a JSON parsing technique to recreate application-defined objects. The state restoration module 408 can restore the application-defined functions by converting the specified string presentation of application code to an executable representation of that code. With respect to application-defined objects that correspond to instantiations of native objects, the state restoration module 408 can use appropriate object-specific transducers to recreate these objects.

In a third phase, the state restoration module 408 can identify links which have not been instantiated, and instantiate those links. For example, links between the environment-defined objects are automatically created by the environment when the frame initially loads. However, the state restoration module 408 is separately applied to restore links between application-defined objects and functions, since those links are represented as "flattened pointers" in the previous state image (see, for example, the flattened pointer $$o752 that object 753 has in FIG. 9). The state restoration module 408 also restores links between application-defined objects and environment-defined objects (and vice versa), since these links are not automatically restored when the execution environment initializes a frame. In all cases, the state restoration module 408 uses the object IDs and function IDs in flattened pointers to determine how to restore missing links.

In block 1806, the state restoration module 408 constructs the DOM tree based on information provided in the DOM tree section 920 of the previous state image. The state restoration module 408 then uses the supplemental data that appears at the end of the DOM section 920 to reestablish any associations between event handlers and DOM nodes. The state restoration module 408 also restores any custom properties of the DOM nodes in a property-specific manner, such as by initializing the bitmaps for any "<canvas>" tags.

In block 1808, the state restoration module 408 can restore any active timers based on information extracted from the timer-related section 1002 of the previous state image. Assume that a timer was expected to fire after the interval 1408 shown in FIG. 14. When the application resumes, the state restoration module 408 can control the timer such that it fires after that interval. The state restoration module 408 can further instruct the timer to fire at a periodicity defined by the interval 1410, assuming that it is an interval-type timer.

In block 1810, the state restoration module 408 restores any in-progress network connections, based on information imparted in the network-related section 1008 of the previous state image. It performs this task by identifying any XMLHttpRequest wrapper objects (created by the monitoring functionality 1304 of FIG. 13) in the previous state image. The state restoration module 408 can use the information imparted by those objects to restart any network connection that was aborted as a result of the suspension of the application.

In block 1812, the state restoration module 408 can extract cookie information from the cookie-related section 1006 of the previous state image. Similarly, the state restoration module 408 can extract DOM-related information from the DOM-related section 1004 of the previous state image. The state restoration module 408 can then add that information to the local data store of the current computing device, assuming that is not already present in that data store.

D. Variations to Promote Migration Efficiency

As described in Section A, the SMM 402 reduces the amount of state information associated with the current state image by representing the state with respect to the operation of the execution environment (e.g., the operation of a browser), rather than the operating of the computing device as a whole. That provision, in turn, allows state information to be stored, transferred, and retrieved in an efficient manner. This section describes further mechanisms that are designed to improve the efficiency of the state migration task.

Figure 19:
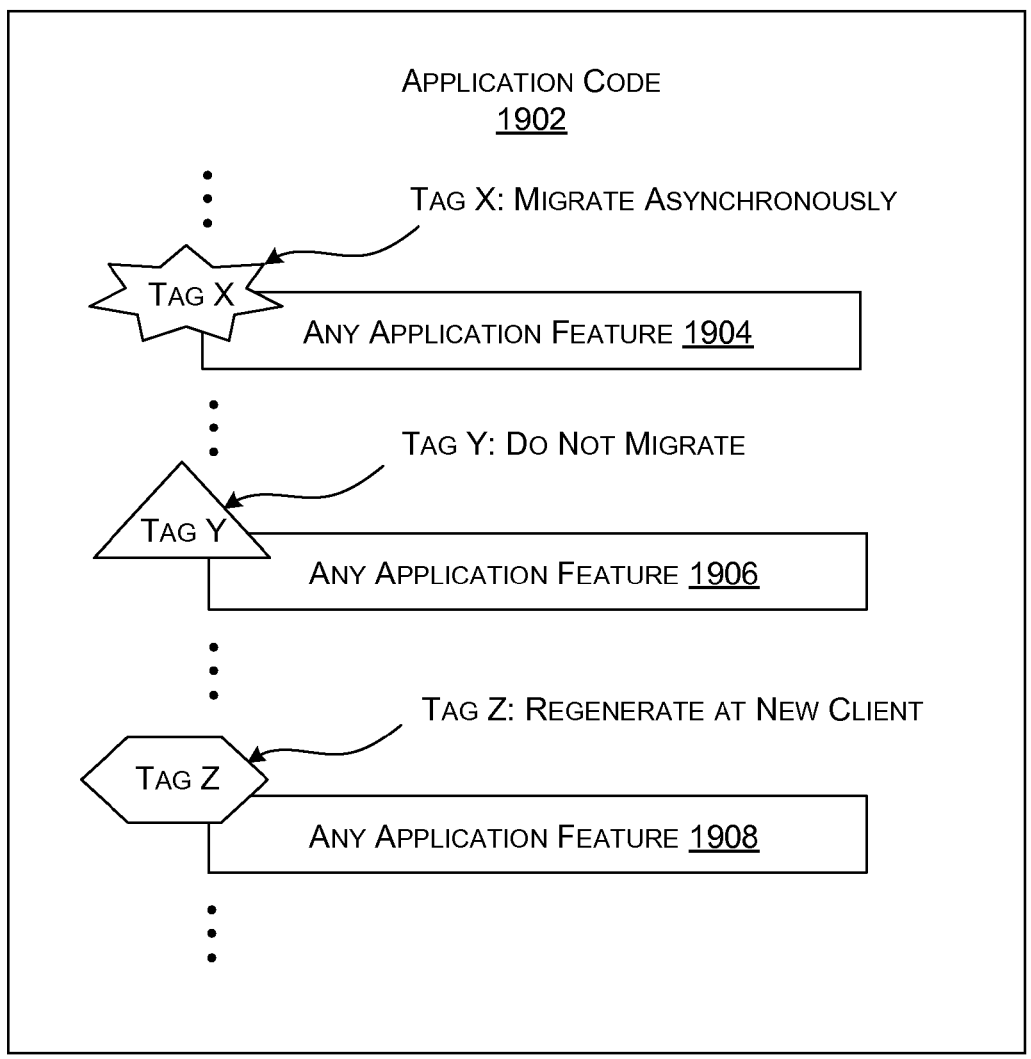
FIG. 19 illustrates a strategy for migrating state information in different ways based on tags added to features of an application, by an application developer.

In the mechanism of FIG. 19, a developer may tag features of application code 1902 with different tags. The features may correspond to any of the application items described above, such as objects, functions, etc. The tags identify different techniques to be used to perform one or more aspects of the migration task. A feature may be annotated with a tag in any manner, such as by adding a property to the feature which conveys a particular type of tag.

At least one feature 1904 is annotated with a tag that indicates that the feature is to be migrated in an asynchronous manner. More specifically, the state capture module 404 may respond to the detection of this tag by storing state information pertaining to the feature 1904 in a particular section of the current state image. That special section may be referred to as the asynchronous section, and the features associated with that section may be referred to as asynchronous features. The remainder of the current state image may be referred to as the synchronous section, and the features associated with that section may be referred to as synchronous features. Upon an instruction to restore the state of the application, the state restoration module 408 will immediately restore all of the synchronous features in the manner described above in Section C. On the other hand, the state restoration module 408 can restore all asynchronous features at a later time, after restoring the synchronous features.

For example, the state restoration module 408 can restore the asynchronous features in an on-demand manner, e.g., when a user is attempting to perform an operation which requires one or more of these features. Alternatively, or in addition, the state restoration module 408 can restore the asynchronous features according to any restoration schedule and/or based on any triggering factors. For example, the state restoration module 408 can restore the asynchronous features on a rolling schedule, in an updating task that takes place in the background with respect to the operation of the application. Alternatively or in addition, the state restoration module 408 can restore the asynchronous features when one or more resource utilization metrics are below a prescribed threshold, e.g., indicating the browser is not overburdened at the current time, and therefore it is an appropriate time to restore the asynchronous features.

To provide one example, the feature 1904 may belong to an infrequently used part of the application. The application developer may designate that feature as an asynchronous feature, on the grounds that it will be unlikely that the user will wish to interact with this feature immediately after reviving the application. But if the user does opt to interact with a part of the application that requires use of the feature, the state restoration module 408 can restore the state for that part at that time, in an on-demand manner.

In one case, the application developer may manually choose a subset of asynchronous features, e.g., based on his or her judgment. In another case, the application developer may consult statistics that reveal the frequency at which features are utilized and/or the stages of an application process at which the features are utilized. The application developer may use the statistics as guidance in choosing the subset asynchronous features.

Alternatively, or in addition, an automated agent within the state capture module 404 can dynamically determine the manner in which the user is using the computing device, and/or the manner in which the user is interacting with the application prior to suspension of the application. That agent may then select a subset of features to be restored in an asynchronous manner. For example, assume that the user appears to be exclusively interacting with only a part of an application; the agent can detect that behavioral pattern, and tag those features as asynchronously migrating. Later, the state restoration module 408 can discover that those features are asynchronously migrating, and load them in the background, or on-demand, as discussed previously. Further, an automated agent in the state restoration module 408 can also monitor the manner in which the user is interacting with the application, following resumption of the application. Based on that pattern, the agent can modify the timing at which it restores yet-to-be-restored features of the application, e.g., by accelerating the restoration of features that are likely to soon needed, and/or delaying the restoration of features that are unlikely to be soon needed.

In yet other cases, an application developer or an automated agent can annotate each feature on a multi-valued scale, indicating a relative degree of urgency associated with the feature. The state restoration module 408 can then restore features in groups having different classes of urgency, as reflected by the tags associated with the features.

Figure 9:
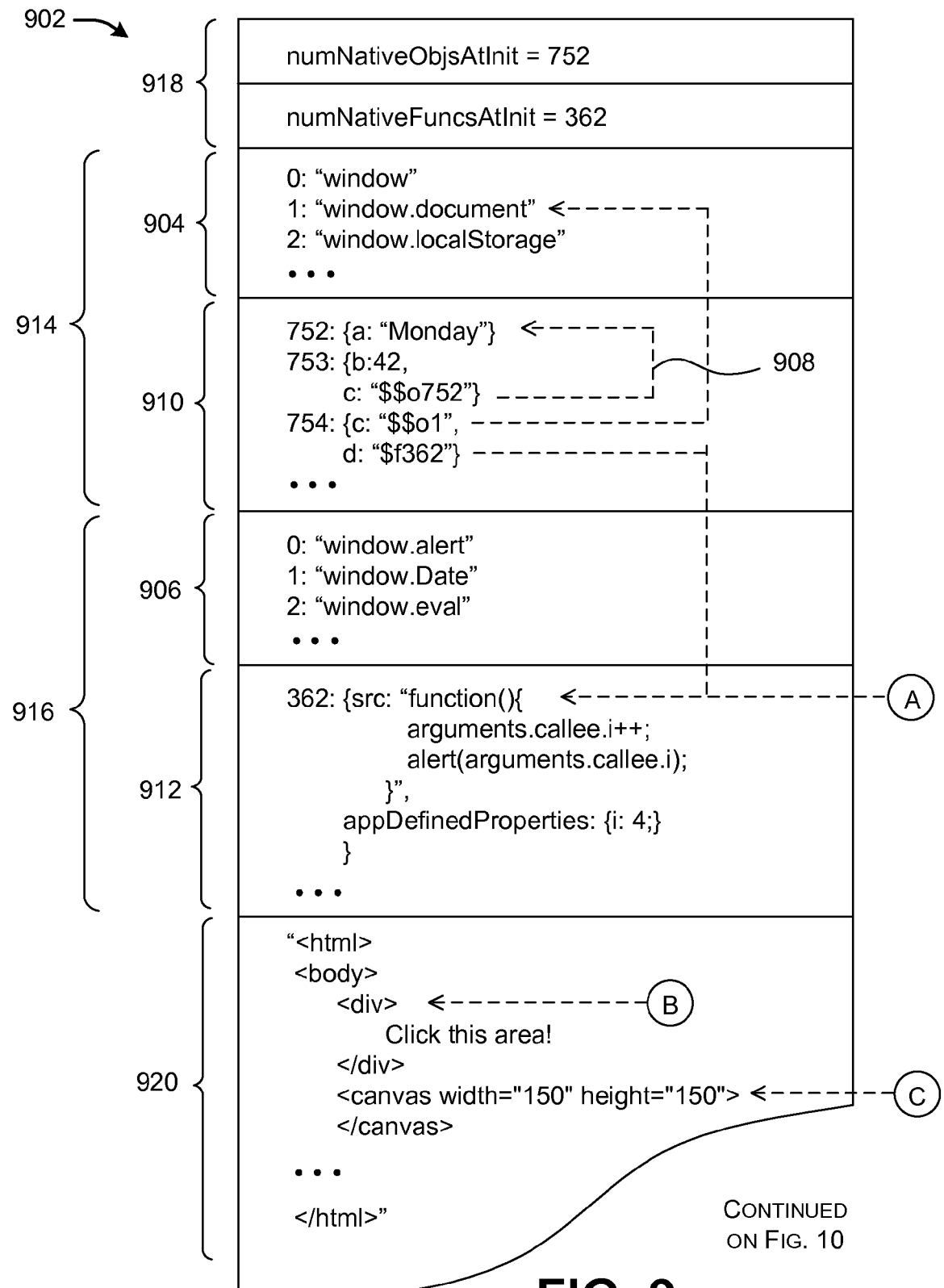
FIGS. 9 and 10 together show a yet more detailed current state image, according to one illustrative implementation.

Continuing on with the description of FIG. 9, at least one other application feature 1906 is annotated with a tag that indicates that it is not to be migrated at all. The state capture module 404 responds to such a tag by not generating and storing state information for the feature 1906. For example, the application developer may determine that a particular feature serves a peripheral and non-critical role in the operation of the application, such as the display of a legal disclaimer. The state capture module 404 can omit state information for such a feature from the current state image. In other case, a particular feature is associated with a function that is typically invoked only when the user first loads an application. The state capture module 404 can omit state information for this feature because it serves no purpose, or diminished purpose, at later stages of the user's interaction with the application. An application developer can choose a subset of features to be tagged with the above-described type of tag in any manner set forth above, e.g., by manually selecting the features in an ad hoc manner, or by consulting statistics that describe the manner in which the features are used in practice.

At least one other application feature 1908 is marked with a tag that indicates that it is not to be restored based on state information provided in the current state image. Rather, the tag instructs the state restoration module 408 to download a fresh version of the feature. Again, an application developer can choose a subset of features to be tagged with the above-described type of tag in any manner set forth above, e.g., by manually selecting the features in an ad hoc manner, or by consulting statistics that describe the manner in which the features are used in practice.

Other implementations may use yet other types of tags. The above examples were cited by way of illustration, not limitation.

FIG. 19 also shows a portion of heap memory 1910. Some features (e.g., objects, functions, etc.) in the heap memory 1910 have tags, e.g., which may be expressed as properties of these features. For example, the feature 1912 and the feature 1914 have respective tags. The state capture module 404 can detect the tags and process the associated features in the manner described above, e.g., by placing state information for some tags in the special asynchronous section of the current state image, or by omitting the state information for the tagged features altogether, and so on. A child feature may inherit the tag of its parent or ancestor. Hence, the state capture module 404 can process child features in the same manner as their respective tagged parent/ancestor features.

Figure 20:
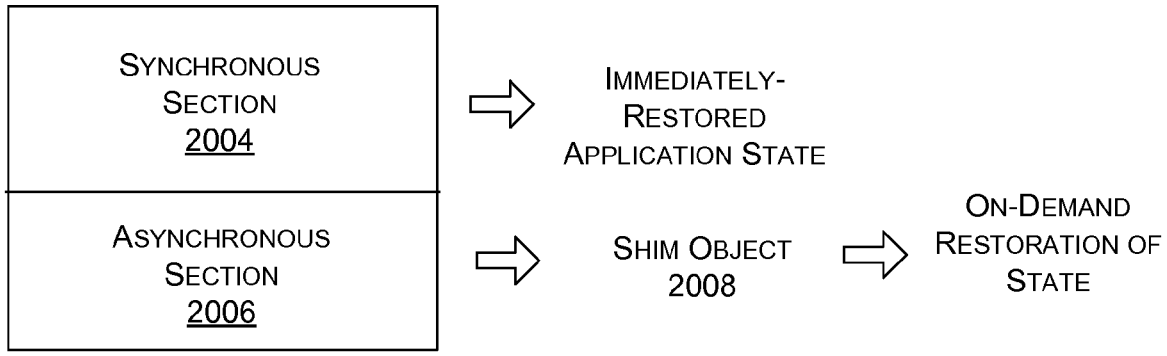
FIG. 20 illustrates one manner by which the state restoration module (of FIG. 4) may restore the state of an application, based on the tags identified in FIG. 19.

FIG. 20 illustrates one technique by which the state restoration module 408 may restore state information in a current state image 2002, where the state information is partitioned into a synchronous section 2004 and an asynchronous section. As described above, the state restoration module 408 may immediately restore the state associated with the synchronous section 2004. The state restoration module 408 may produce a shim object 2008 for one or more features represented by the asynchronous section 2006. If the restored application ever accesses the shim object 2008 (indicating that the application wishes to use that feature), the shim object 2008 will restore the relevant features associated with the asynchronous section 2006.

As a second provision designed to improve efficiency, the state capture module 404 can incrementally store state information associated with the application, prior to suspending the application. Once the application is suspended, the state capture module 404 can perform a final incremental update of the state information, if needed. By virtue of such a technique, the SMM 402 can reduce the amount of time that is required to capture the state information at the time that the application is suspended. In one case, the state capture module 404 performs the above-identified incremental update operation to capture state information for the DOM storage values, as stored on the local data store of the computing device. That is, the state capture module 404 may target the DOM-related information because it may represent the largest part of the current state image.

Figure 21:
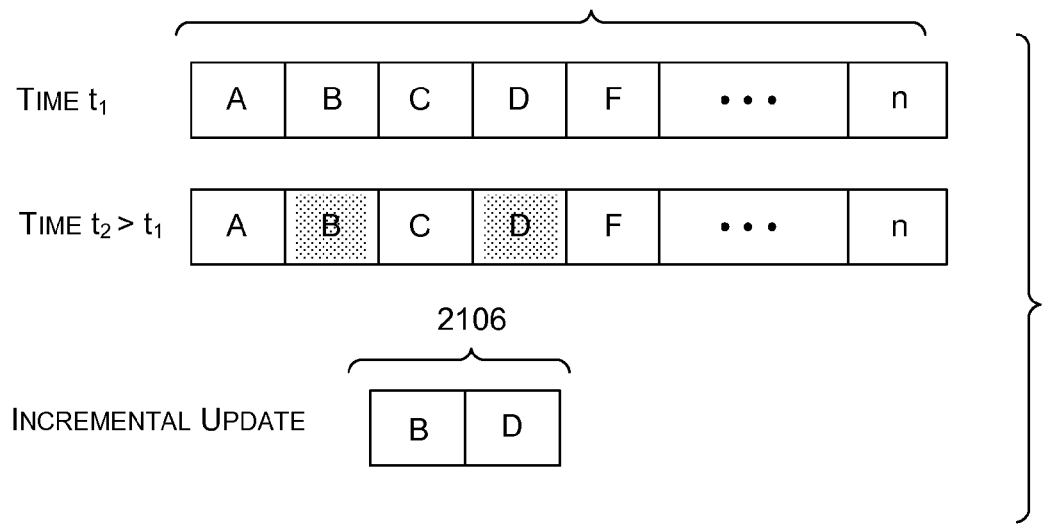
FIG. 21 illustrates a strategy for incrementally storing current state information, using update segments having equal sizes.

For example, with reference to FIG. 21, assume that at time $t_1$, the local DOM storage 2102 contains a first instance of DOM information. That DOM information is generically illustrated as being composed of values labeled as A, B, C, etc. At time $t_2$ ($t_2 > t_1$), the DOM storage 2102 stores a second instance of DOM information. As graphically represented in FIG. 21, at time $t_2$, only the values labeled as "B" and "D" have changed. Accordingly, the state capture module 404 can update the current state image only with respect to the subset of information 2106 associated with the values B and D.

More specifically, the state capture module 404 can compute hashes of the DOM storage values that exist at a current time in the local data store, or just the hashes of the values which are being newly added to the local data store. The state capture module 404 can then compare the current hashes with a collection of previous hashes associated with a previously captured state of the DOM storage. This operation yields a set of zero, one, or more differing hashes, corresponding to DOM storage values that have changed since the last examination of state. The state capture module 404 can then add state information associated with the changed values to the current state image. In one case, the state capture module 404 can store that incremental update information in a local data store. Alternatively, or in addition, the state capture module 404 can send the incremental update information to the remote data store 126 for storage.

Figure 22:
FIG. 22 shows a variation of the strategy of FIG. 21.

FIG. 22 shows a variation of the technique described above. That is, as generally indicated in FIG. 22, the DOM storage 2202 may contain values of different sizes; some values may be very small, and some values may be very large. If a value is large, the state capture module 404 can logically split the value into multiple pieces (e.g., using the known Rabin fingerprint hashing technique), and only generate incremental updates for the value with respect to the pieces of that value that have changed. The pieces of a value may have different content-based sizes.

The state restoration module 408 can also selectively download DOM storage chunks (e.g., from the remote data store 126) which are not already present in the local storage of the computing device, on which the application is being revived.

Figure 23:
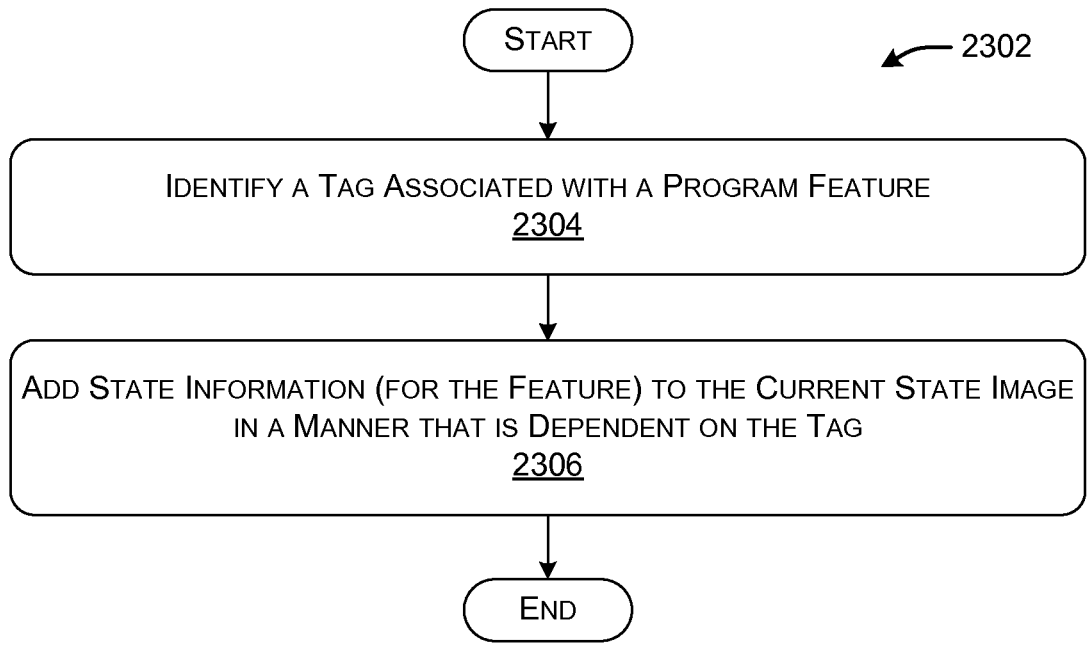
FIG. 23 is a process that describes the operation of the tagging strategy (of FIGS. 19 and 20), from the perspective of the state capture module (of FIG. 4).

FIG. 23 is a process 2302 which represents one manner of operation of the state capture module 404, in response to encountering tagged features. In block 2304, the state capture module 404 identifies a tag associated with a feature. In block 2306, the state capture module 404 adds state information, associated with the feature to the current state image in a manner that is dependent on the tag. For example, if the tag indicates that the feature is an asynchronous feature, then the state capture module stores state information in an asynchronous section of the current state image.

Figure 24:
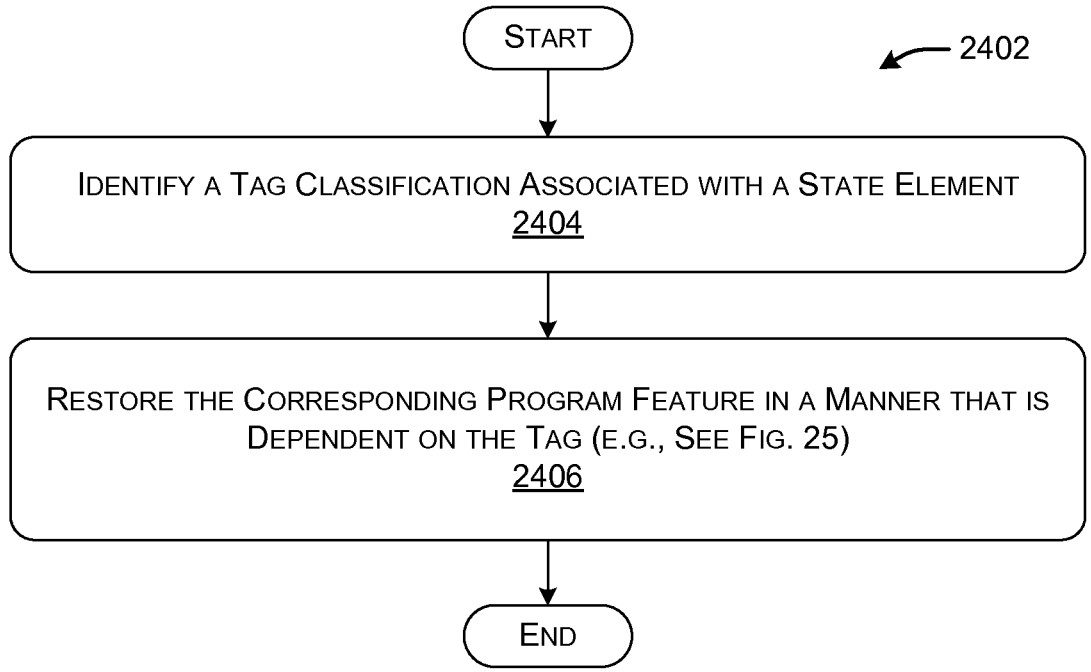
FIGS. 24 and 25 are processes that describe the operation of the tagging strategy (of FIGS. 19 and 20), from the perspective of the state restoration module (of FIG. 4).

FIG. 24 shows a process 2402 for restoring features based on tags associated with the features. In block 2402, the state restoration module 408 identifies a classification associated with a state element, which, in turn, indicates that the associated feature was tagged with a particular tag. In block 2406, the state restoration module 408 restores the program feature in a manner that is dependent on its tag, e.g., by asynchronously restoring the feature if its state information appears in the special asynchronous section of the current state image.

Figure 25:
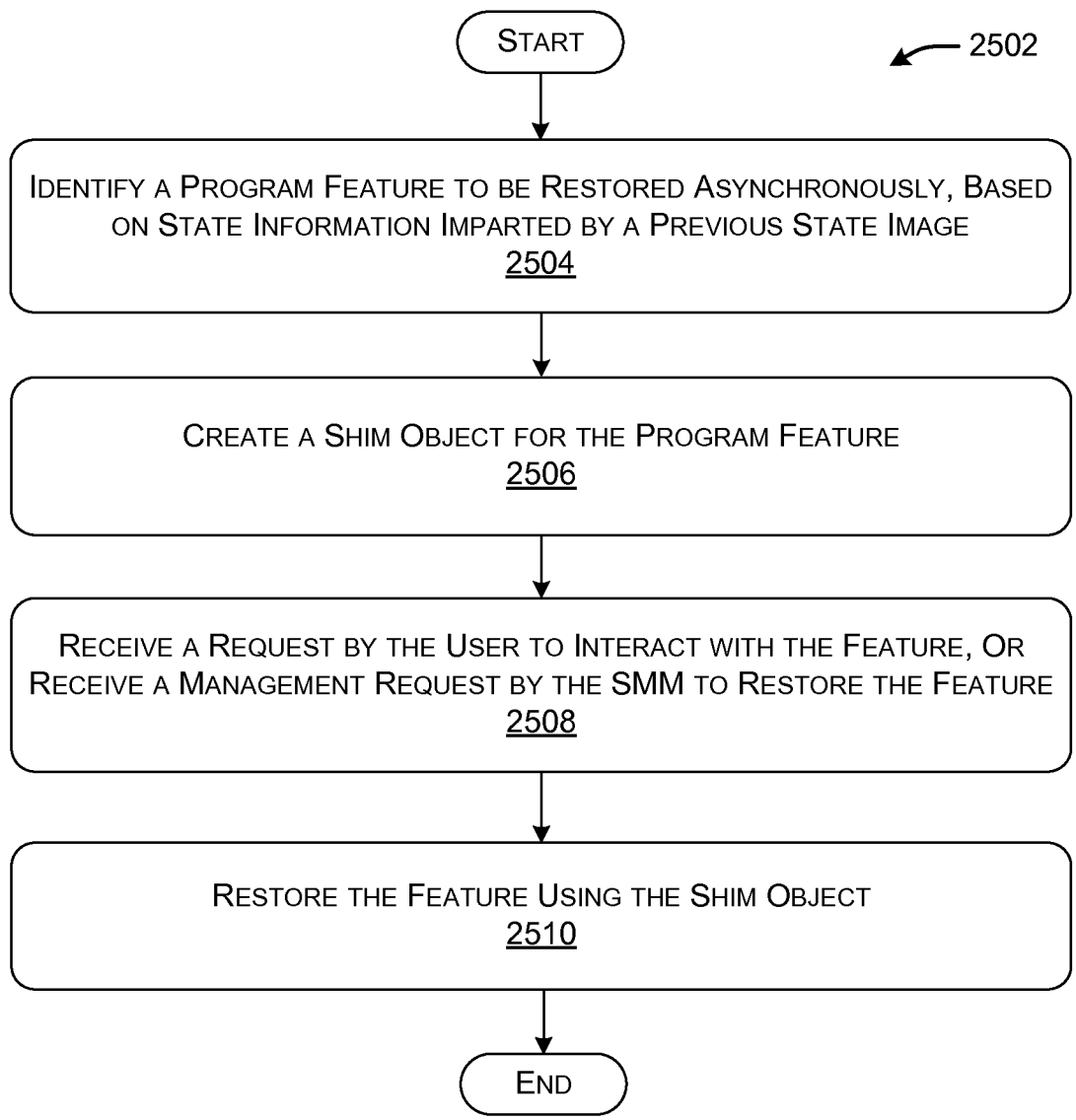

FIG. 25 shows a process 2502 that represents one particular manner that the state restoration module 408 may restore a feature that has been tagged as being asynchronous. In block 2504, the state restoration module 408 identifies that the program feature to be restored is an asynchronous feature, e.g., based on the presence of state information for the feature in the asynchronous section of the current state image. In block 2506, the state restoration module 408 produces a shim object for the program feature. In block 2508, the state restoration module 408 receives a request by the user to interact with the feature. Or the state restoration module 408 independently chooses to restore the feature under consideration. In block 2510, the state restoration module 408 restores the feature, replacing the shim object with the actual feature.

Figure 26:
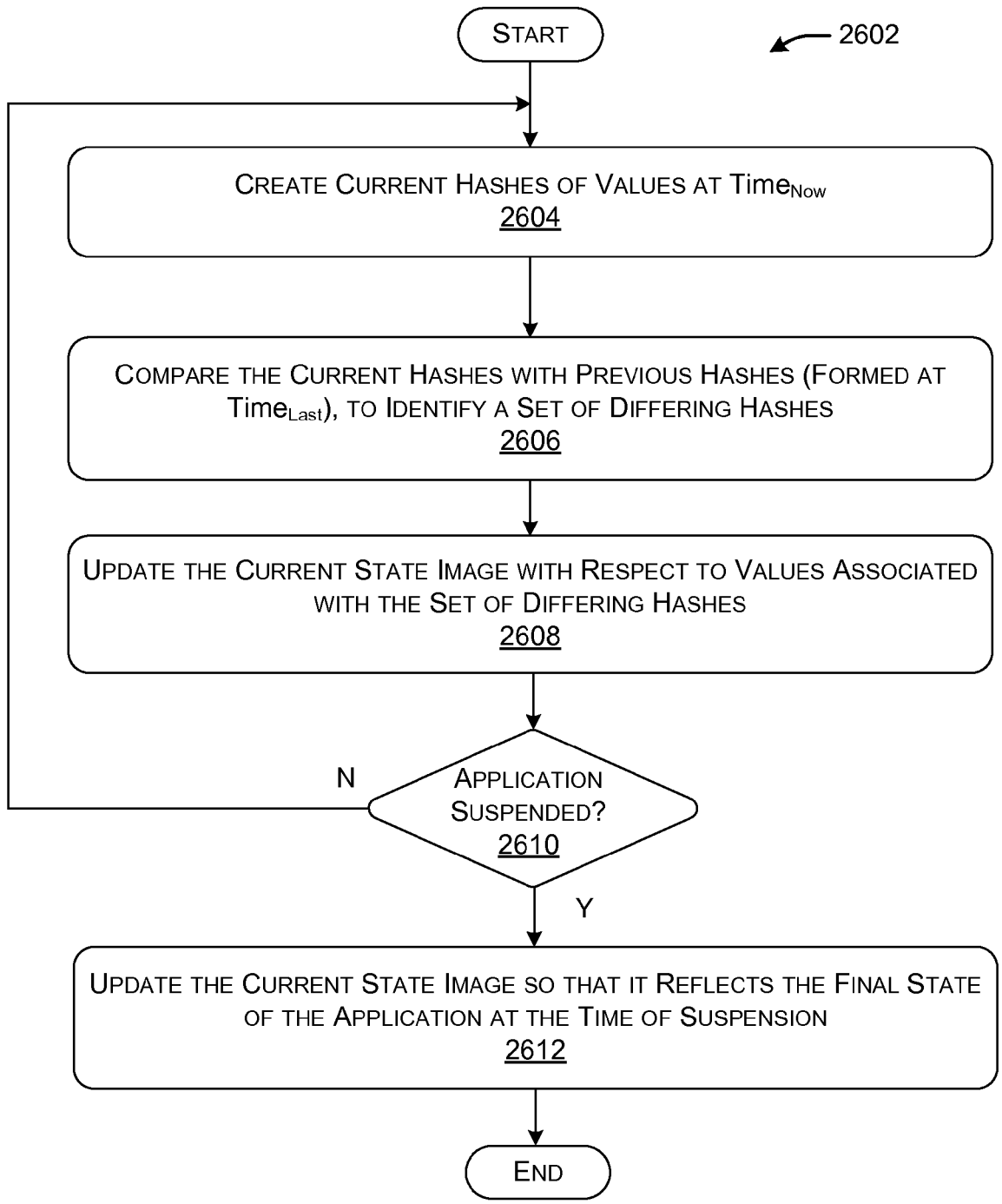
FIG. 26 is a process that describes the operation of the incremental update operation (of FIGS. 21 and 22), from the perspective of the state capture module (of FIG. 4).

FIG. 26 shows a process 2602 for incrementally updating a current state image. In block 2606, the state capture module 404 creates current hashes of a collection of values that exist at a current time. In block 2606, the state capture module 404 compares the current hashes with previous hashes associated with the collection of values, as they existed at a previous time. This operation yields a set of zero, one, or more differing hashes.

In block 2608, the state capture module 404 updates the current state image with respect to values that correspond to hashes in the set of differing hashes. In block 2610, the state capture module 404 determines whether the application has been suspended. In block 2612, the state capture module 404 updates the current state image so that it reflects the final state of the application at the time of suspension. In the context of FIG. 26, the term "values" has broad meaning; for instance, in the case in which the Rabin fingerprinting method is used, a value may correspond to a piece of a larger value.

E. Representative Computing Functionality

FIG. 27 shows computing functionality 2702 that can be used to implement any aspect of environment 102 of FIG. 1. For instance, the type of computing functionality 2702 shown in FIG. 22 can be used to implement any aspect of any user computing device (e.g., client computing devices 104 and 108 of FIG. 1), any server computing device (e.g., the application source 116 and the migration management module 128 of FIG. 1), and so on. In all cases, the computing functionality 2702 represents one or more physical and tangible processing mechanisms.

The computing functionality 2702 can include one or more processing devices 2704, such as one or more central processing units (CPUs), and/or one or more graphical processing units (GPUs), and so on.

The computing functionality 2702 can also include any storage resources 2706 for storing any kind of information, such as code, settings, data, etc. Without limitation, for instance, the storage resources 2706 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 2702. The computing functionality 2702 may perform any of the functions described above when the processing devices 2704 carry out instructions stored in any storage resource or combination of storage resources.

As to terminology, any of the storage resources 2706, or any combination of the storage resources 2706, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 2702 also includes one or more drive mechanisms 2708 for interacting with any storage resource, such as a hard disk drive mechanism, an optical disk drive mechanism, and so on.

The computing functionality 2702 also includes an input/output module 2710 for receiving various inputs (via input devices 2712), and for providing various outputs (via output devices 2714). The input devices 2712 can include any of key entry devices, mouse entry devices, touch-enabled entry devices, voice entry devices, and so on. One particular output mechanism may include a presentation device 2716 and an associated graphical user interface (GUI) 2718. The computing functionality 2702 can also include one or more network interfaces 2720 for exchanging data with other devices via one or more networks 2722. One or more communication buses 2724 communicatively couple the above-described components together.

The network(s) 2722 can be implemented in any manner, e.g., by a local area network, a wide area network (e.g., the Internet), point-to-point connections, etc., or any combination thereof. The network(s) 2722 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2702 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer readable storage medium for storing computer readable instructions, the computer readable instructions, when executed by one or more processing devices, perform a method for capturing a state of an application using a state capture module, the method comprising:
identifying a current state of an application that runs in an execution environment on a computing device;
expressing the current state as a current state image; and
storing the current state image in at least one destination data store, the current state being assessed relative to operation of the execution environment, which corresponds to a higher level of abstraction compared to hardware or an operating system interface provided by the computing device; and
restoring a previous state based on a corresponding previous state image,
wherein the state capture module includes monitoring functionality for monitoring creation and removal of timers and event handlers, to enable capture of state information regarding the timers and event handlers.

2. The computer readable storage medium of claim 1, wherein the execution environment is provided by a browser module.

3. The computer readable storage medium of claim 1, wherein the SMM is implemented as a library module which is received from a remote entity.

4. The computer readable storage medium of claim 1, wherein the at least one destination data store corresponds to a local data store provided by the computing device.

5. The computer readable storage medium of claim 1, wherein the at least one destination data store corresponds to a remote data store, with respect to the computing device.

6. The computer readable storage medium of claim 1, wherein the state capture module is configured to discover application-defined objects using an introspective or reflective capability of a language that is used to express the application.

7. The computer readable storage medium of claim 1, wherein the current state also describes environment-defined objects and environment-defined functions, as present in the memory of the computing device, corresponding to features defined by the execution environment.

8. The computer readable storage medium of claim 1,
wherein the application includes at least one nested function that is nested in at least one outer function, to produce a closure, and
wherein the state capture module is further configured to statically rewrite the closure to make any closure variables, associated with the nested function, explicit.

9. The computer readable storage medium of claim 1, wherein the current state also describes features associated with a document object model (DOM) tree, produced by the application.

10. The computer readable storage medium of claim 9, wherein the current state also describes any application-defined properties associated with nodes of the DOM tree.

11. The computer readable storage medium of claim 1, wherein the current state also describes features associated with one or more timers registered by the application.

12. The computer readable storage medium of claim 11, wherein the current state, for an interval-based timer, is described by:
an interval after which the interval-based timer will first fire, following restoration of the application; and
an interval period at which the interval-based timer will repeatedly fire, following the first fire.

13. The computer readable storage medium of claim 1, wherein the current state also represents features associated with one or more in-progress network connections.

14. The computer readable storage medium of claim 1, wherein the current state also represents features associated with information stored in a local data store of the computing device.

15. The computer readable storage medium of claim 1,
wherein the state capture module is configured to capture the state of the application in a manner that depends on tags associated with features of the application, and
wherein the state restoration module is configured to restore the application in a manner that depends on the tags associated with the features, as conveyed by the previous state image.

16. The computer readable storage medium of claim 1, wherein the state restoration module is configured to restore at least one feature in an asynchronous manner based on an instruction in the previous state image to treat said at least one feature in an asynchronous manner.

17. The SMM of claim 1, wherein the state capture module is configured to:
create one or more current hashes of information, as the information exists at a current time;
compare said one or more current hashes with previous hashes, the previous hashes representing hashes of the information as the information existed at a previous time, to identify a set of current hashes which differ from the previous hashes; and
selectively update the current state image with respect to features associated with the set of current hashes.

18. A method, implemented by a computing device, for capturing a state of an application, comprising:
identifying a current state of the application that runs in an execution environment on the computing device;
expressing the current state as a current state image; and
storing the current state image in least one destination data store,
the current state being assessed relative to operation of the execution environment, corresponding to a higher level of abstraction compared to hardware or an operating system interface provided by the computing device, and
the application including at least one nested function that establishes a closure, and the current state correctly representing the nested function, wherein the closure is statically rewritten to make any closure variables, associated with the nested function, explicit.

19. A computer readable storage medium for storing computer readable instructions, the computer readable instructions performing a method, when executed by one or more processing devices, the method comprising:
accessing a previous state image associated with a previous state of an application, in response to a request to invoke the application, and a determination that the previous state image exists; and
restoring the application based on the previous state image,
said restoring comprising restoring at least one feature of the application in an asynchronous manner based on an instruction in the previous state image to treat said at least one feature in an asynchronous manner.

20. The computer readable storage medium of claim 19, wherein restoring the application based on the previous state image comprises receiving an application stub to instantiate a state restoration module to retrieve the previous state image.

* * * * *